United States Patent
Kobayashi

(10) Patent No.: US 7,312,935 B2
(45) Date of Patent: Dec. 25, 2007

(54) OPTICAL SYSTEM AND OPTICAL APPARATUS HAVING THE SAME

(75) Inventor: Mikio Kobayashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 36 days.

(21) Appl. No.: 11/450,663

(22) Filed: Jun. 8, 2006

(65) Prior Publication Data

US 2006/0285227 A1 Dec. 21, 2006

(30) Foreign Application Priority Data

Jun. 15, 2005 (JP) .............................. 2005-175495

(51) Int. Cl.
*G02B 9/36* (2006.01)
*G02B 9/34* (2006.01)
*G02B 9/62* (2006.01)

(52) U.S. Cl. .................. 359/776; 359/775; 359/771; 359/760; 359/756

(58) Field of Classification Search ................ 359/756, 359/757, 760, 771, 772, 775, 776
See application file for complete search history.

(56) References Cited

U.S. PATENT DOCUMENTS

| 5,638,215 A | 6/1997 | Neil |
| 5,731,907 A | 3/1998 | Sigler |
| 5,930,043 A | 7/1999 | Ogawa |
| 6,437,926 B2 | 8/2002 | Mori |
| 2007/0201146 A1* | 8/2007 | Saruwatari .................. 359/690 |
| 2007/0201147 A1* | 8/2007 | Yokoyama .................. 359/691 |

FOREIGN PATENT DOCUMENTS

| JP | 10-170818 A | 6/1998 |
| JP | 2001-337271 A | 12/2001 |

* cited by examiner

*Primary Examiner*—David N. Spector
(74) *Attorney, Agent, or Firm*—Canon USA, Inc., IP Division

(57) ABSTRACT

At least one exemplary embodiment is directed to an optical system which includes a plurality of refractive optical elements arranged substantially symmetrically with respect to an aperture-stop. Furthermore the optical system comprises a refractive optical element being constituted by a solid material. An Abbe number $vd$ of the solid material and a partial dispersion ratio $\theta gF$ of the solid material can satisfy the following conditions:

$$\theta gF - (-1.665 \times 10^{-7} \cdot vd^3 + 5.213 \times 10^{-5} \cdot vd^2 - 5.656 \times 10^{-3} \cdot vd + 0.755) > 0,$$

$$\theta gF - (-1.665 \times 10^{-7} \cdot vd^3 + 5.213 \times 10^{-5} \cdot vd^2 - 5.656 \times 10^{-3} \cdot vd + 1.011) < 0.$$

22 Claims, 15 Drawing Sheets

OPTICAL SYSTEM AND OPTICAL APPARATUS HAVING THE SAME

BACKGROUND OF THE INVENTION

1. Field of the Invention

The present invention relates to an optical system and an optical apparatus having the optical system.

2. Description of the Related Art

In general, in the optical system used in optical apparatuses including digital cameras, video cameras, and copying machines, as the miniaturization of the entire optical system is extended by reducing the entire lens length (the entire length of the optical system, which is the distance between the first lens surface adjacent to the object and the image plane), the more chromatic aberration including axial chromatic aberration and transverse chromatic aberration (chromatic aberration of magnification) is generated so as to have a tendency to reduce optical performances.

In particular, in a Gauss-type optical system and a modified Gauss-type optical system, such as a Xenoter type and an ortho-meter type, in that lenses are arranged roughly symmetrically with respect to an aperture diaphragm, since an F number is comparatively small (bright) as well as an angle of view is comparatively large, it has been difficult to correct chromatic aberration over the entire picture while suppressing various aberrations including spherical aberration, coma, and astigmatism.

In order to reduce such chromatic aberration, methods using an extraordinary partial dispersion material and using a diffractive optical element in an optical path are generally well-known.

As a method for correcting the axial chromatic aberration over the broad wavelength band, an image-read lens with the chromatic aberration corrected using an optical material, such as fluorite, having low refractive and dispersion functions and extraordinary partial dispersion has been known (Japanese Patent Laid-Open No. 2001-337271, corresponding to U.S. Pat. No. 6,437,926).

Since the extraordinary partial dispersion material of the optical material such as fluorite has a low refraction index of about 1.5, the material can be used in an optical system with a focal length longer than that of a medium-telephoto lens and with the comparatively small change in aberration due to the change in angle of view. However, it can be difficult to correct various aberrations in a well-balanced state using the extraordinary partial dispersion material in optical systems other than this optical system.

Also, a Gauss-type optical system has been known that can use a diffractive optical element so as to correct and/or reduce the chromatic aberration without using the extraordinary partial dispersion optical material (Japanese Patent Laid-Open No. H10-170818, corresponding to U.S. Pat. No. 5,930,043).

Also, a liquid material having characteristics of comparatively high dispersion and extraordinary partial dispersion is known among materials, having chromatic-aberration correction functions, related to the diffractive optical element, and an achromatic optical system using the liquid material is proposed (U.S. Pat. Nos. 5,731,907 and 5,638,215).

When a lens made of a material, such as fluorite, with low refraction and low dispersion is used in the Gauss-type optical system and the modified Gauss-type optical system, such as a Xenoter type and an ortho-meter type, frequently employed for a standard lens of a single-lens reflex camera for 35 mm film, the change in angle of view of aberration is large because of the large angle of view, and furthermore, the chromatic aberration does not change larger than a predetermined value if the refracting power of the lens surface is not largely changed. Therefore, it can be difficult to correct both the chromatic aberration and the various aberrations such as the spherical aberration, the coma, and the astigmatism.

On the other hand, although the diffractive optical element has a sufficient correction function of the chromatic aberration, unnecessary diffraction light in the order of diffraction other than that designed for practical use is generated.

Since the material discussed in U.S. Pat. Nos. 5,731,907 and No. 5,638,215 is liquid, when it is used as an optical material, the manufacturing is difficult because of the necessity of the structure for sealing it. Also, characteristics, such as the refracting index and the dispersion, are largely changed with the change in temperature, so that the environmental resistance is insufficient. Furthermore, the interface to air is not obtained, so that the chromatic aberration is difficult to be sufficiently corrected.

SUMMARY OF THE INVENTION

The present invention is directed to an optical system that can be used in an optical apparatus (e.g., a camera for silver film, a digital still camera, a video camera, a telescope, a binocular, a projector, a copying machine, and other optical apparatus as known by one of ordinary skill in the relevant art and equivalents).

According to an aspect of the present invention, an optical system facilitates correcting and/or reducing various aberrations including chromatic aberration.

According to an aspect of the present invention, an exemplary optical system includes a plurality of refractive optical elements arranged symmetrically or substantially symmetrically with respect to an aperture-stop. The optical system includes a refractive optical element being constituted a solid material. The solid material can satisfy any of the following conditions:

$$\theta gF - (-1.665 \times 10^{-7} \cdot vd^3 + 5.213 \times 10^{-5} \cdot vd^2 - 5.656 \times 10^{-3} \cdot vd + 0.755) > 0 \quad (1)$$

$$\theta gF - (-1.665 \times 10^{-7} \cdot vd^3 + 5.213 \times 10^{-5} \cdot vd^2 - 5.656 \times 10^{-3} \cdot vd + 1.011) < 0 \quad (2),$$

where $vd$ is an Abbe number of the solid material; and $\theta gF$ is a partial dispersion ratio of the solid material.

Furthermore, the partial dispersion ratio $\theta gF$ of the solid material can satisfy the following condition:

$$\theta gd - (-1.687 \times 10^{-7} vd^3 + 5.702 \times 10^{-5} vd - 6.603 \times 10^{-3} \cdot vd + 1.500) > 0 \quad (3)$$

$$\theta gd - (-1.687 \times 10^{-7} vd^3 + 5.702 \times 10^{-5} vd^2 - 6.603 \times 10^{-3} vd + 1.809) < 0 \quad (4).$$

Furthermore, the Abbe number $vd$ of the solid material can satisfy the following condition:

$$vd < 60 \quad (5).$$

According to another aspect of the present invention, the definition of the Abbe number $vd$ and the partial dispersion ratio $\theta gd$ or $\theta gF$ is the same as that used generally, and they are expressed by the following equations:

$$vd = (Nd-1)/(NF-NC)$$

$$\theta gd = (Ng-Nd)/(NF-NC)$$

$$\theta gF = (Ng-NF)/(NF-NC),$$

where Ng, NF, Nd, and NC are refractive indexes for a g-line (435.8 nm), an F-line (486.1 nm), a d-line (587.6 nm), and a C-line (656.3 nm), respectively.

Also, the technical extent of "symmetrical with respect to an aperture-stop" will be apparent in below mentioned embodiments.

Further features of the present invention will become apparent from the following description of exemplary embodiments with reference to the attached drawings.

DESCRIPTION OF THE EMBODIMENTS

Figure 1:
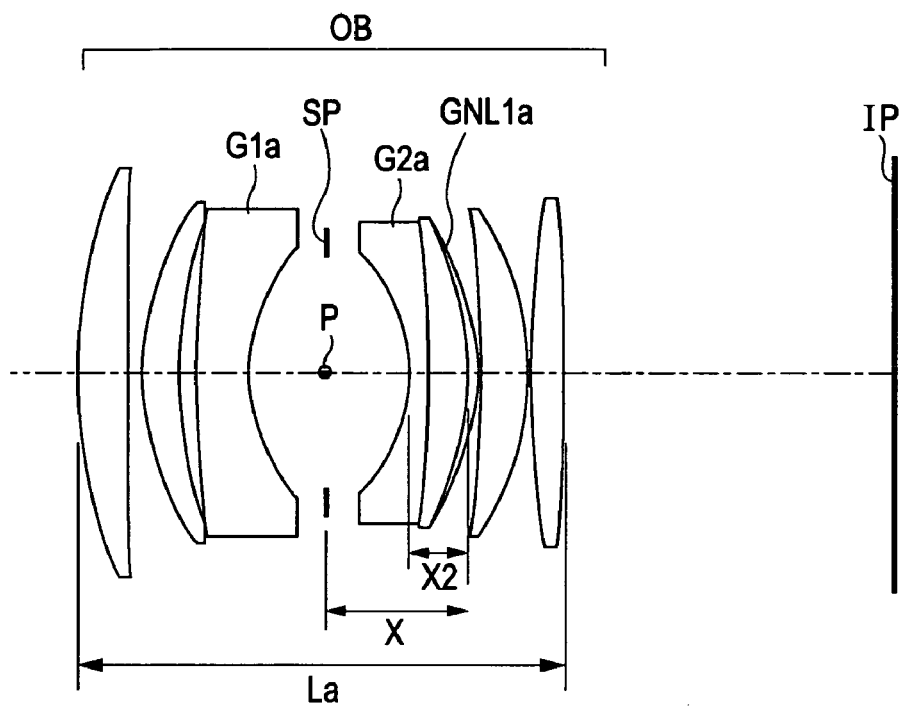
FIG. 1 is an optical sectional view of an optical system according to an example 1 of at least one exemplary embodiment.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

An optical system according to at least one exemplary embodiment and an optical apparatus, which can have the optical system, will be described below.

Figure 2:
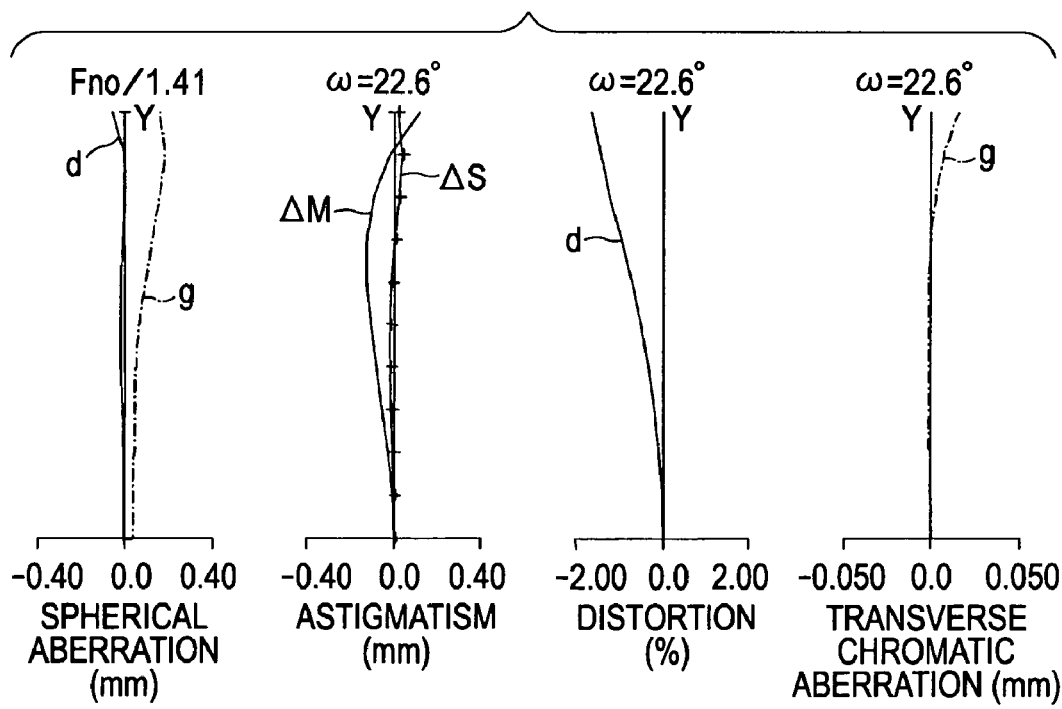
FIG. 2 is an aberration drawing of the optical system according to example 1.

FIG. 1 is a lens-sectional view of an optical system according to an example 1 of at least one exemplary embodiment; FIG. 2 is an aberration drawing of focusing an object at infinity according to example 1.

Figure 3:
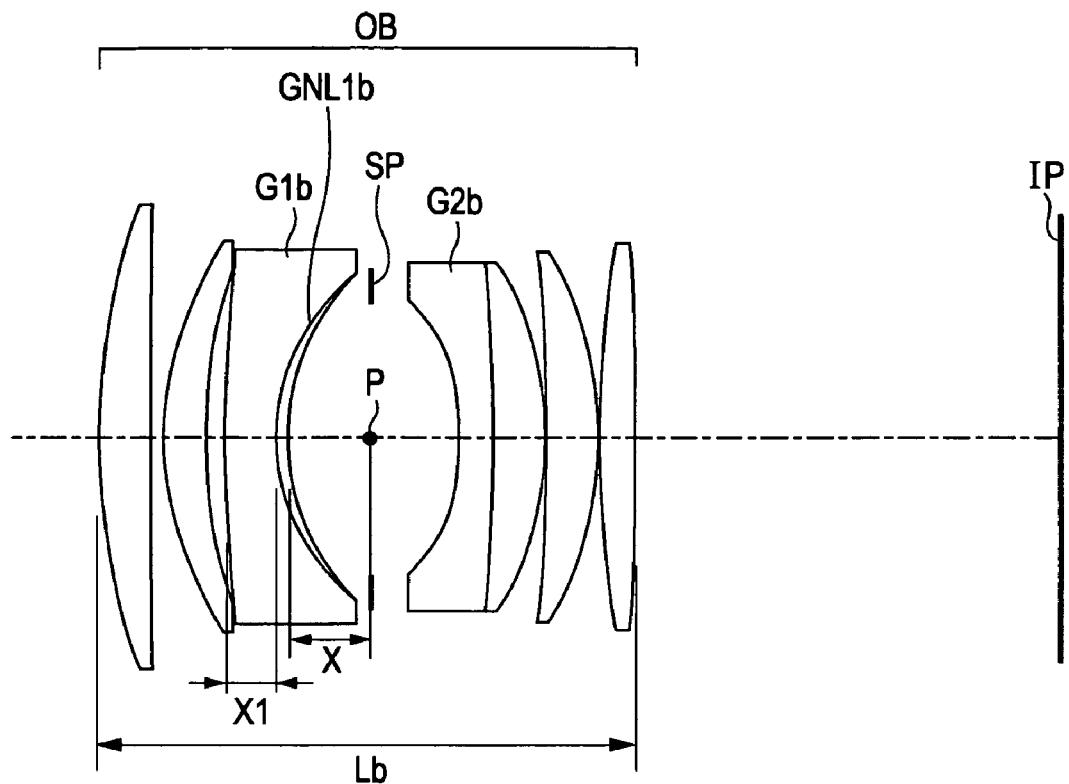
FIG. 3 is an optical sectional view of an optical system according to an example 2 of at least one exemplary embodiment.
Figure 4:
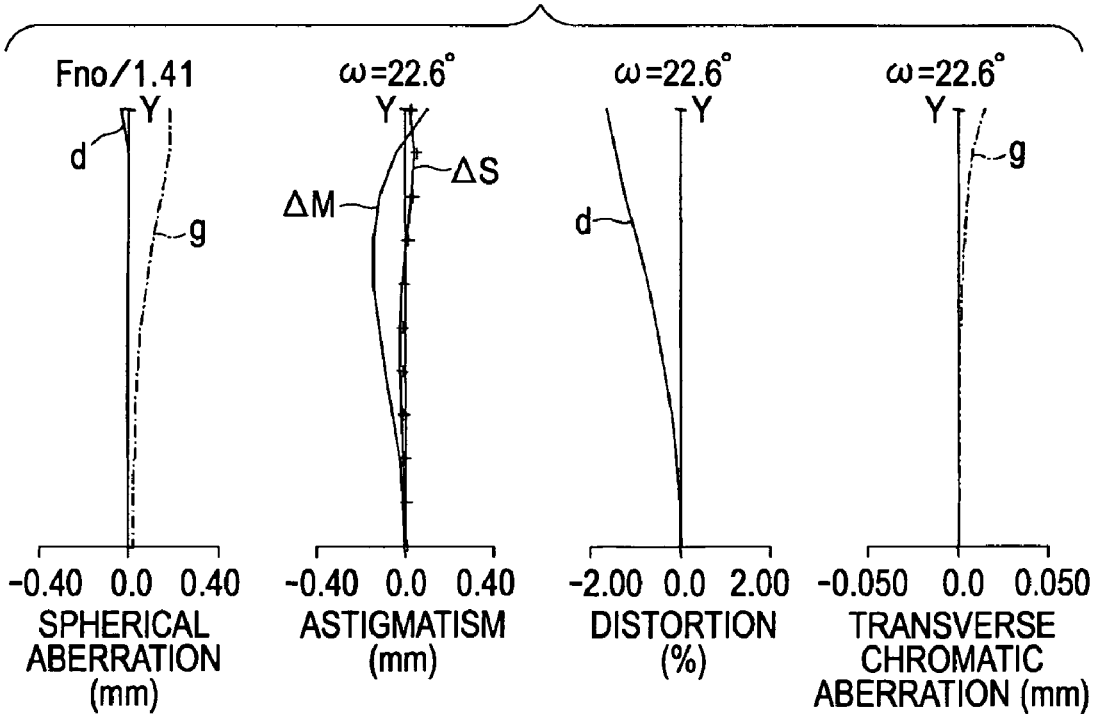
FIG. 4 is an aberration drawing of the optical system according to example 2.

FIG. 3 is a lens-sectional view of an optical system according to an example 2 of at least one exemplary embodiment; FIG. 4 is an aberration drawing of focusing an object at infinity according to example 2.

Figure 5:
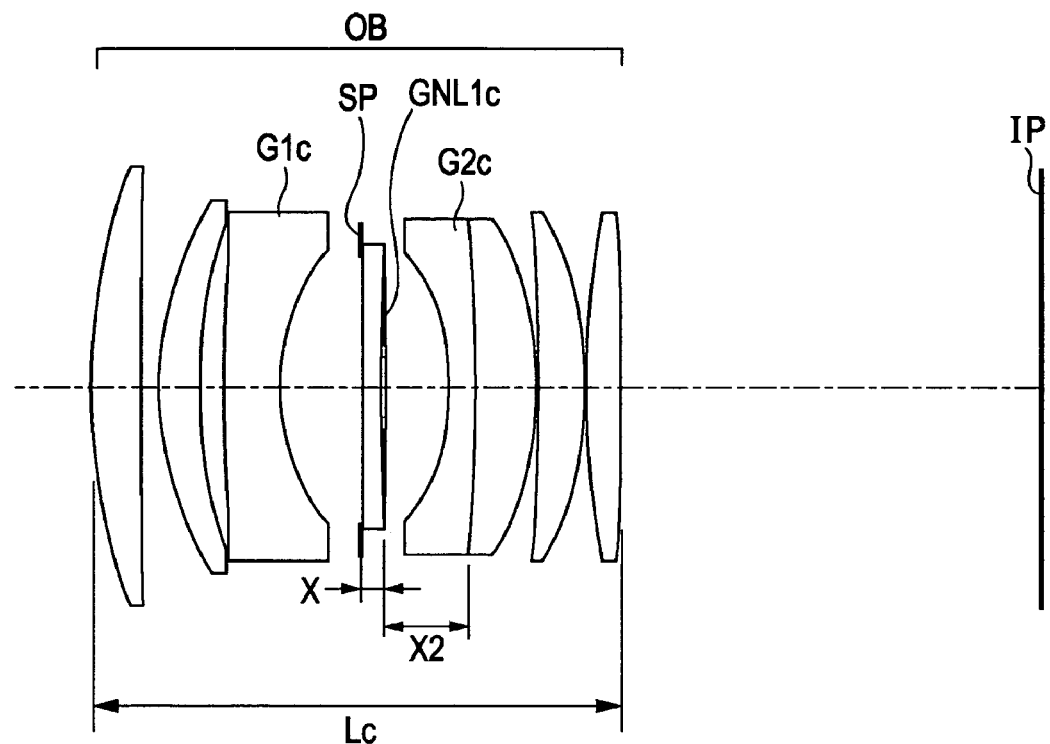
FIG. 5 is an optical sectional view of an optical system according to an example 3 of at least one exemplary embodiment.
Figure 6:
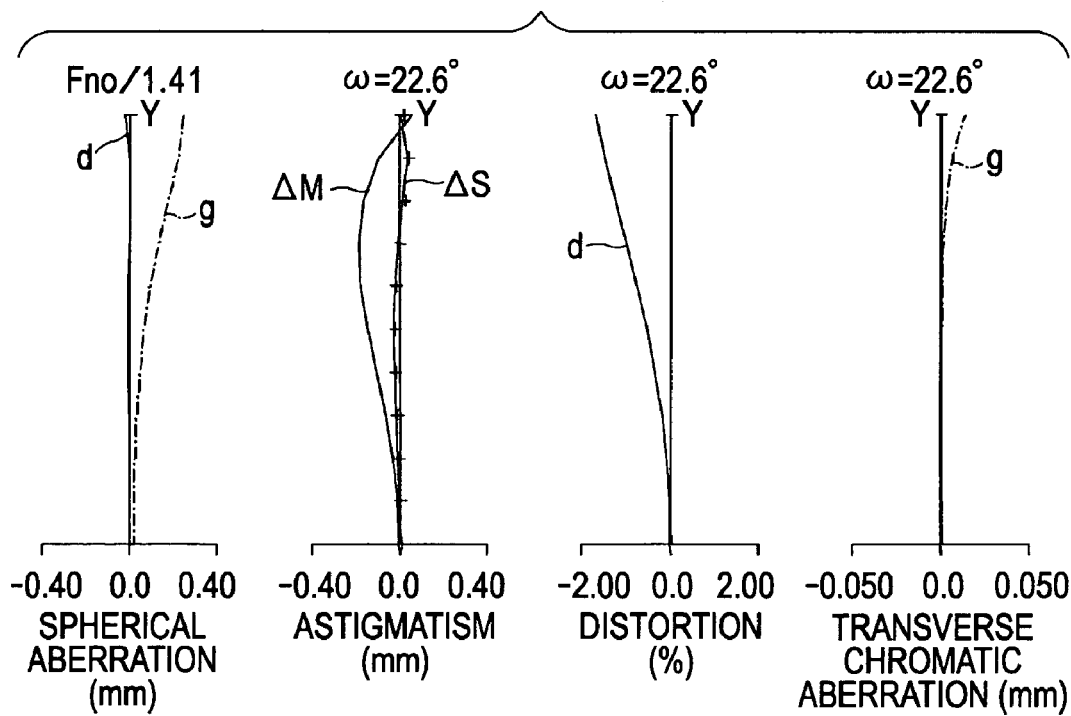
FIG. 6 is an aberration drawing of the optical system according to example 3.

FIG. 5 is a lens-sectional view of an optical system according to an example 3 of at least one exemplary embodiment; FIG. 6 is an aberration drawing of focusing an object at infinity according to example 3.

Figure 7:
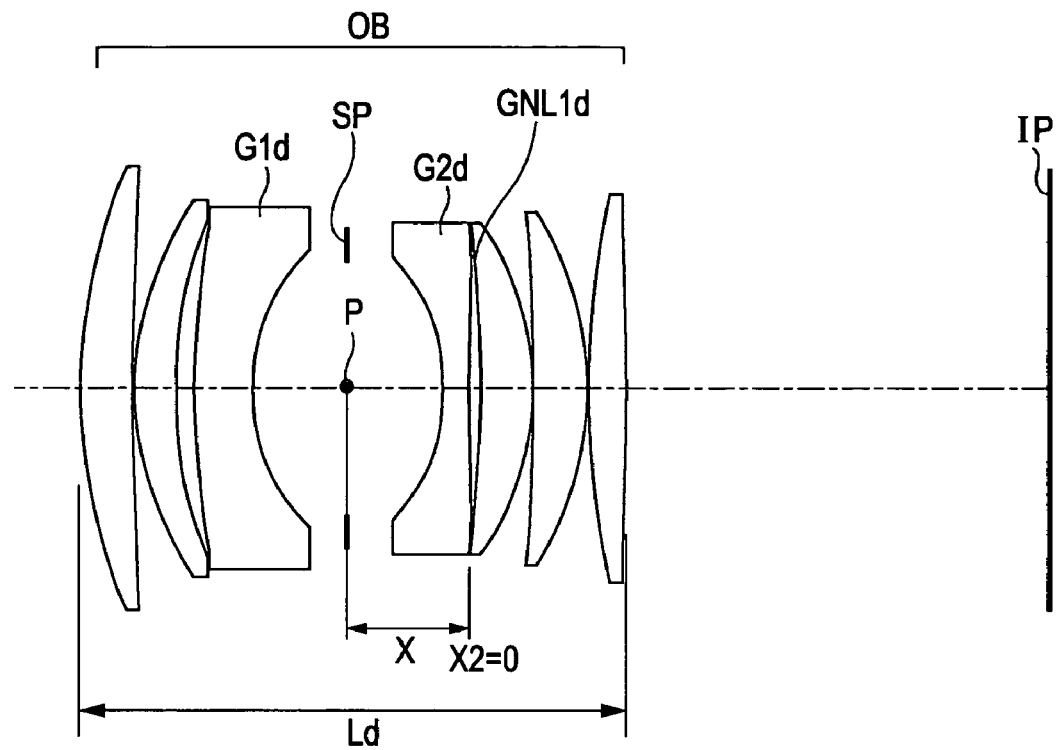
FIG. 7 is an optical sectional view of an optical system according to an example 4 of at least one exemplary embodiment.
Figure 8:
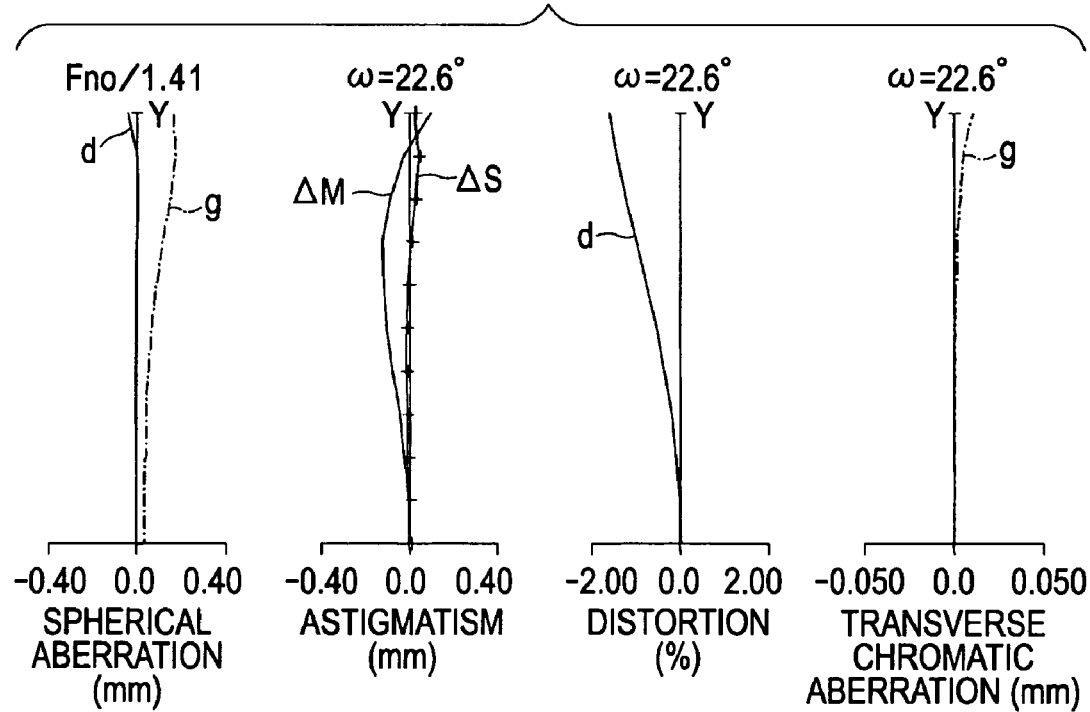
FIG. 8 is an aberration drawing of the optical system according to example 4.

FIG. 7 is a lens-sectional view of an optical system according to an example 4 of at least one exemplary embodiment; FIG. 8 is an aberration drawing of focusing an object at infinity according to example 4.

Figure 9:
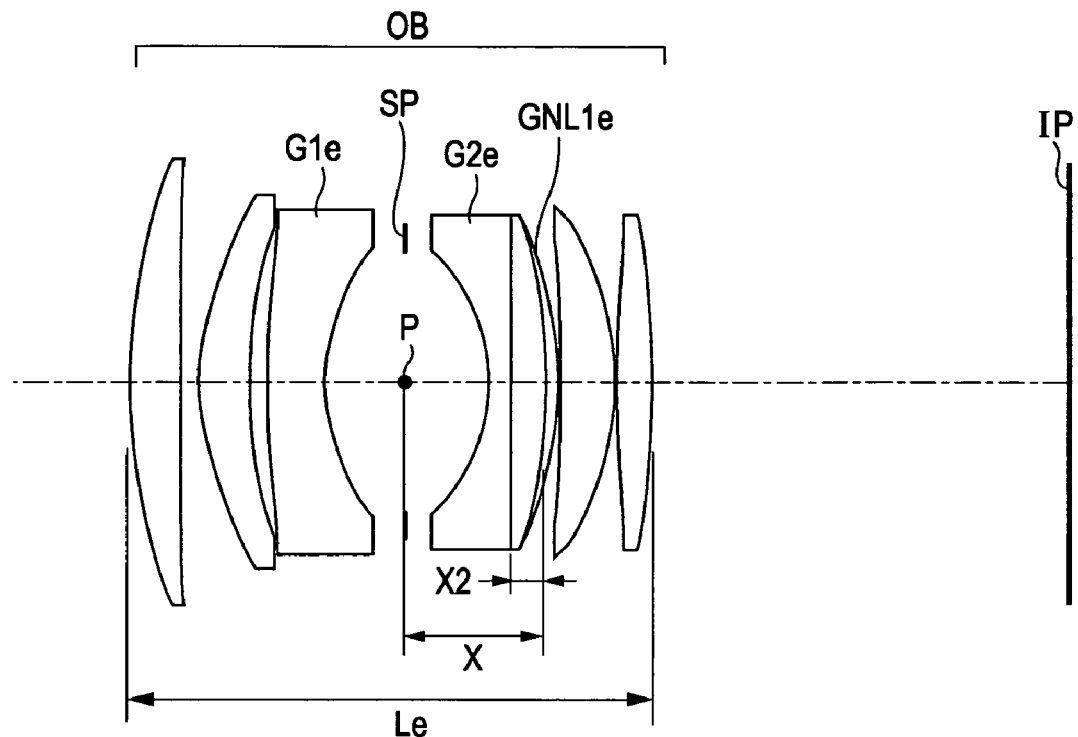
FIG. 9 is an optical sectional view of an optical system according to an example 5 of at least one exemplary embodiment.
Figure 10:
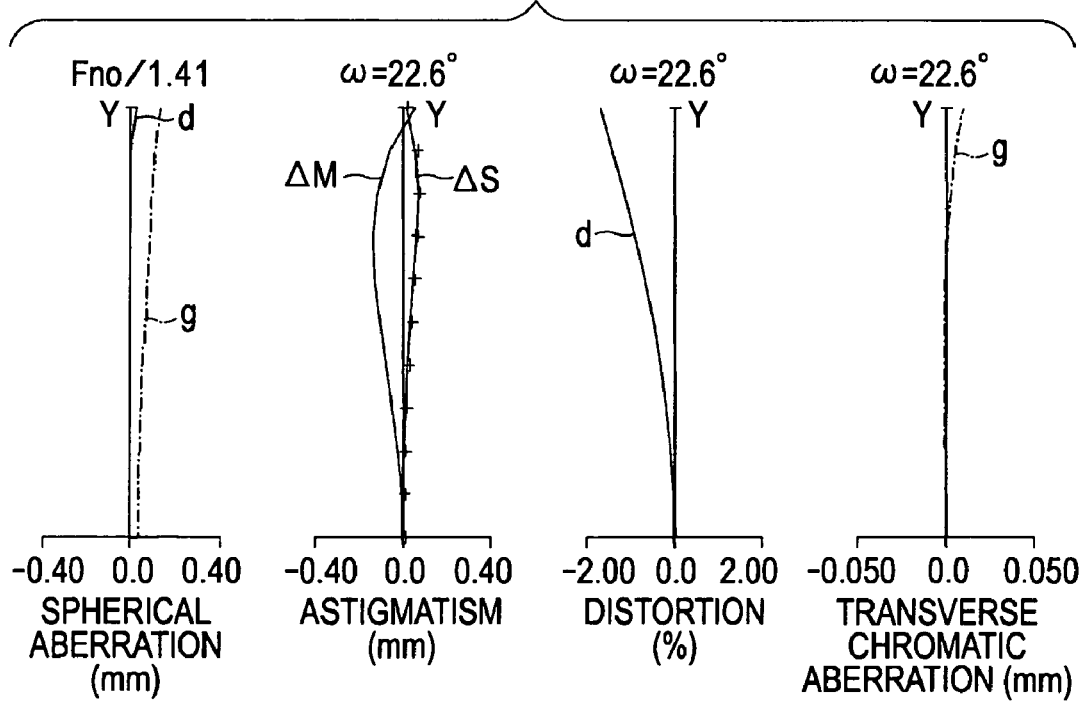
FIG. 10 is an aberration drawing of the optical system according to example 5.

FIG. 9 is a lens-sectional view of an optical system according to an example 5 of at least one exemplary embodiment; FIG. 10 is an aberration drawing of focusing an object at infinity according to example 5.

Figure 11:
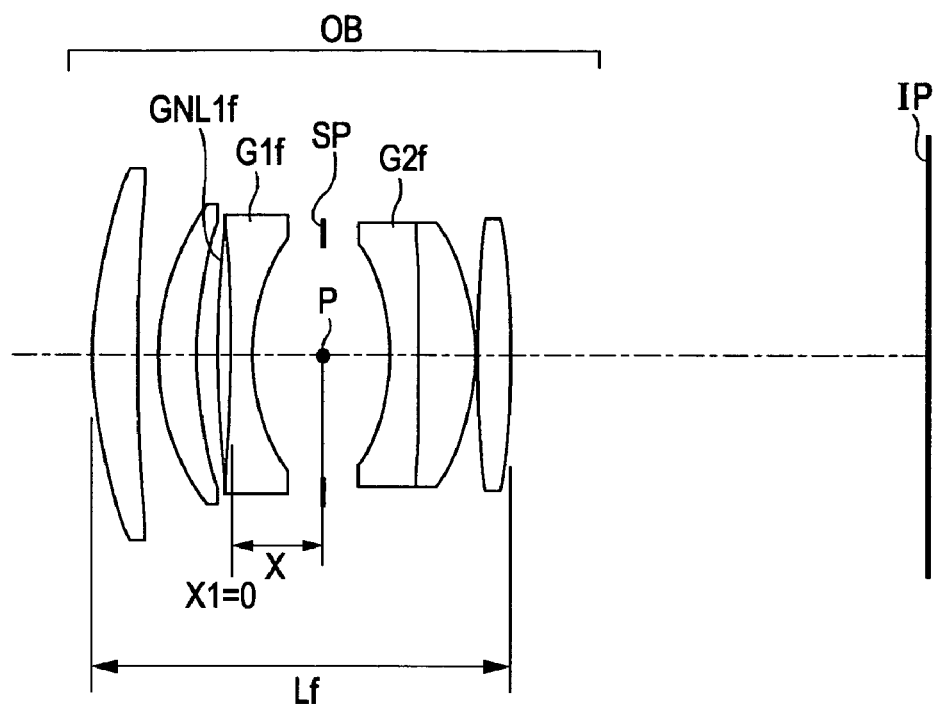
FIG. 11 is an optical sectional view of an optical system according to an example 6 of at least one exemplary embodiment.
Figure 12:
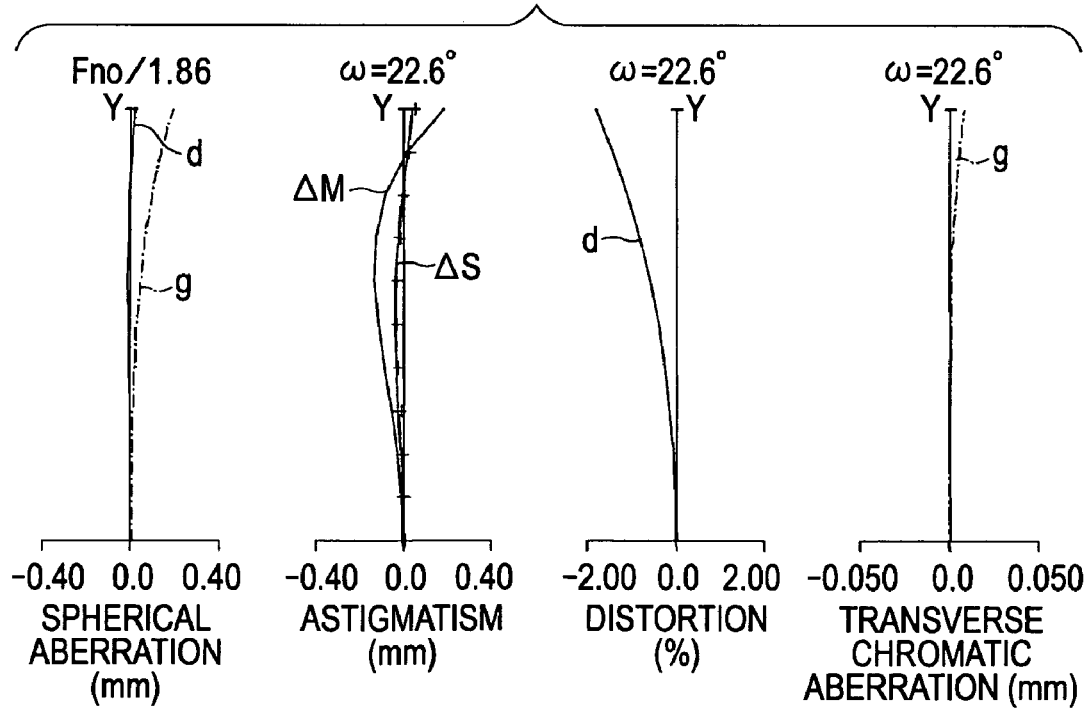
FIG. 12 is an aberration drawing of the optical system according to example 6.

FIG. 11 is a lens-sectional view of an optical system according to an example 6 of at least one exemplary embodiment; FIG. 12 is an aberration drawing of focusing an object at infinity according to example 6.

Figure 13:
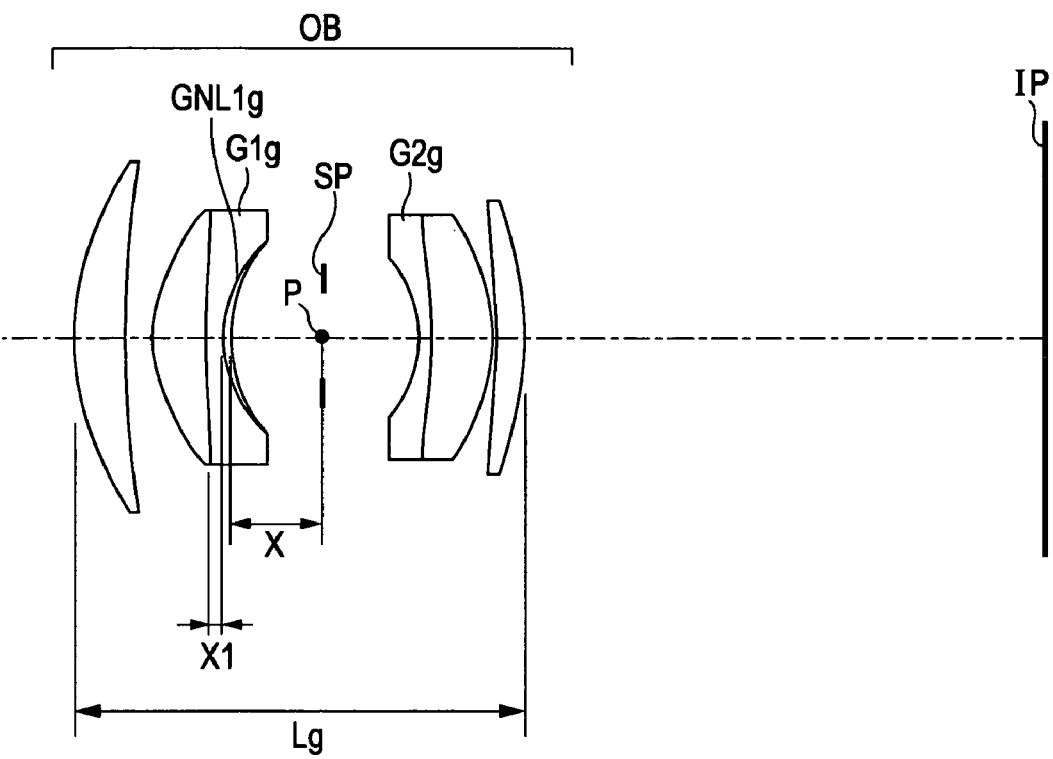
FIG. 13 is an optical sectional view of an optical system according to an example 7 of at least one exemplary embodiment.
Figure 14:
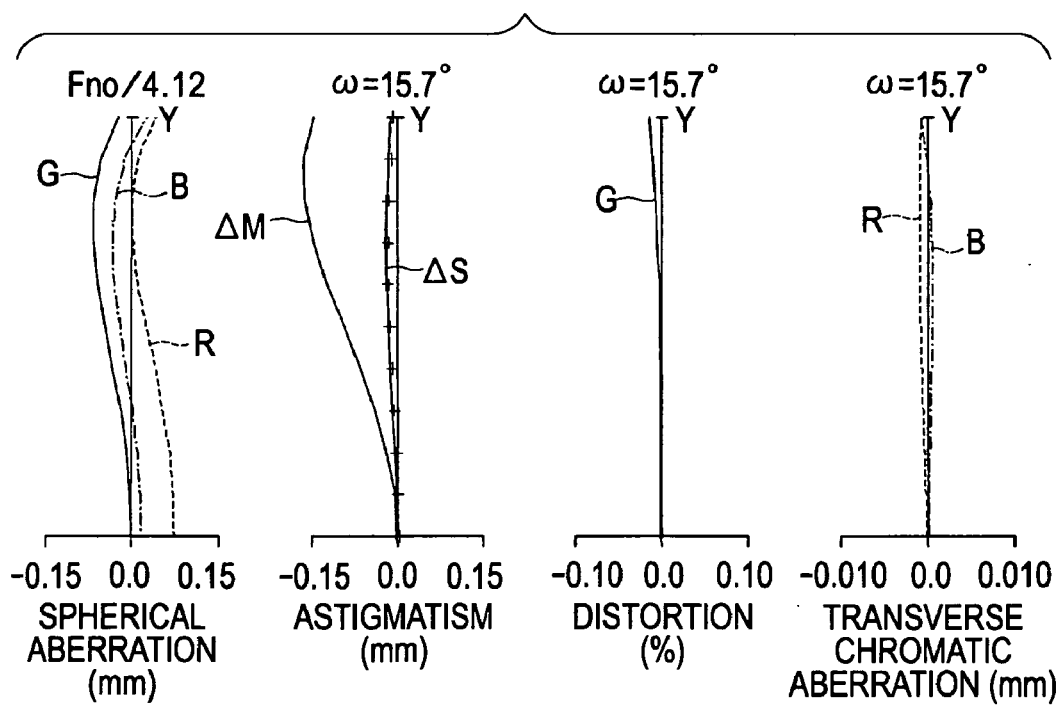
FIG. 14 is an aberration drawing of the optical system according to example 7.

FIG. 13 is a lens-sectional view of an optical system according to an example 7 of at least one exemplary embodiment; FIG. 14 is an aberration drawing of focusing an object at infinity according to example 7.

Figure 15:
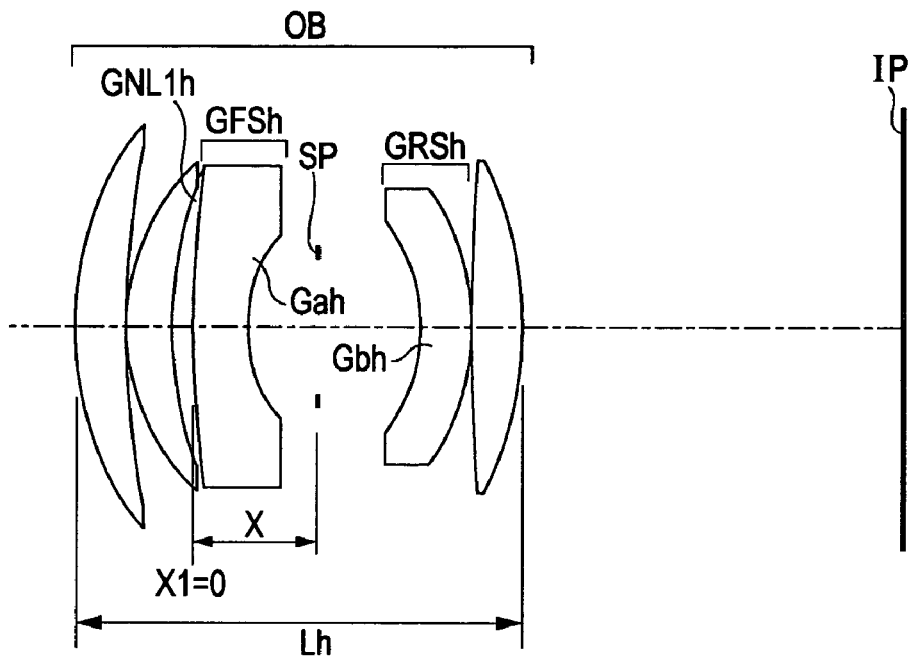
FIG. 15 is an optical sectional view of an optical system according to an example 8 of at least one exemplary embodiment.
Figure 16:
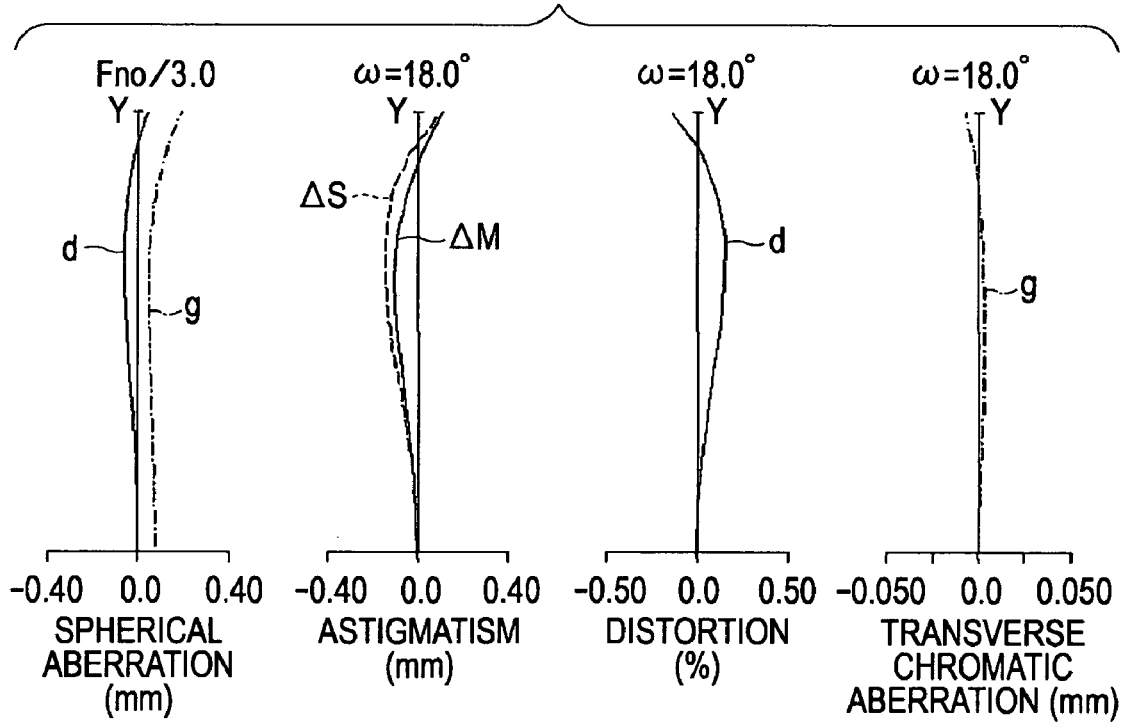
FIG. 16 is an aberration drawing of the optical system according to example 8.

FIG. 15 is a lens-sectional view of an optical system according to an example 8 of at least one exemplary embodiment; FIG. 16 is an aberration drawing of focusing an object at infinity according to example 8.

Figure 17:
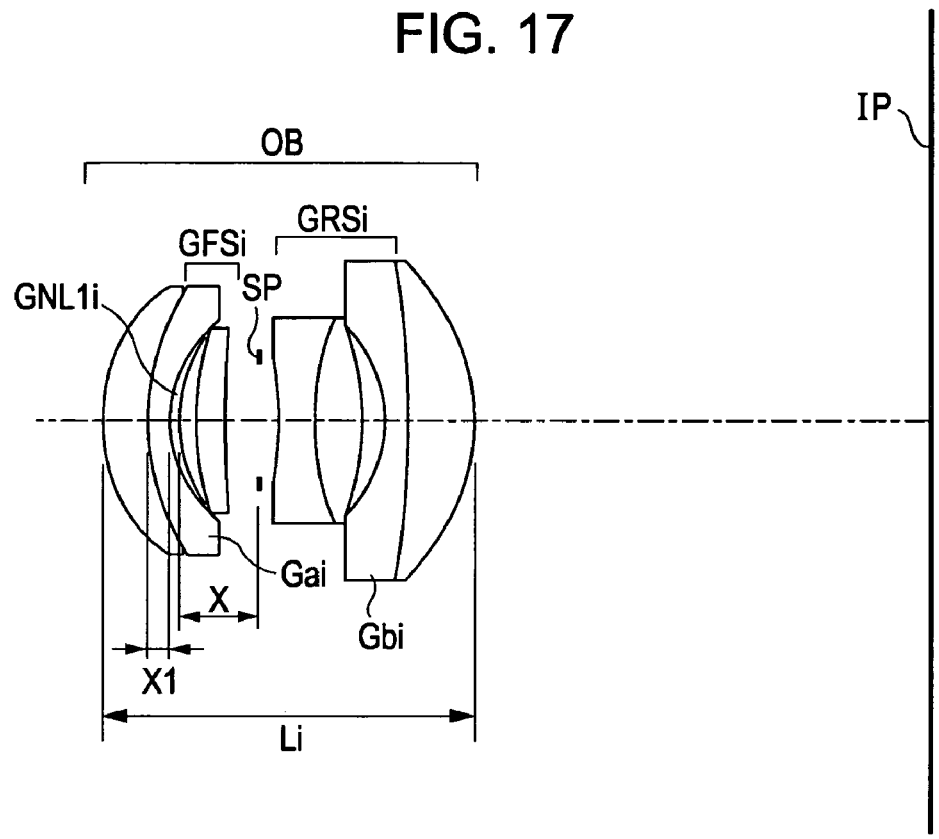
FIG. 17 is an optical sectional view of an optical system according to an example 9 of at least one exemplary embodiment.
Figure 18:
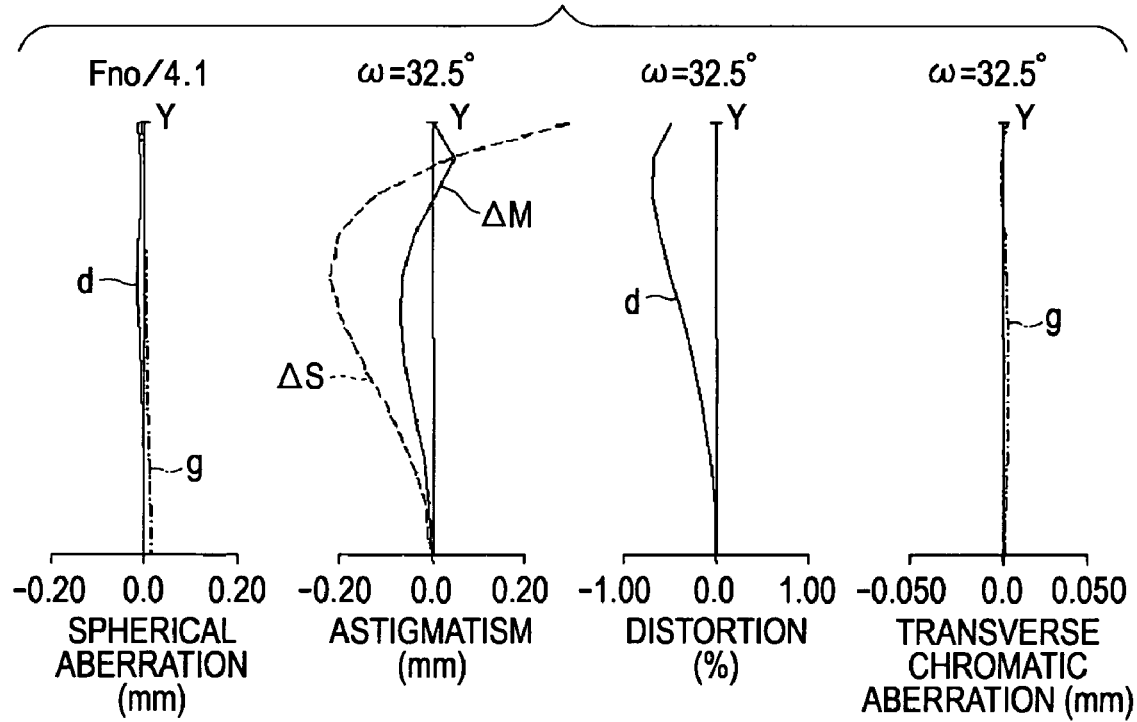
FIG. 18 is an aberration drawing of the optical system according to example 9.

FIG. 17 is a lens-sectional view of an optical system according to an example 9 of at least one exemplary embodiment; FIG. 18 is an aberration drawing of focusing an object at infinity according to example 9.

Figure 19:
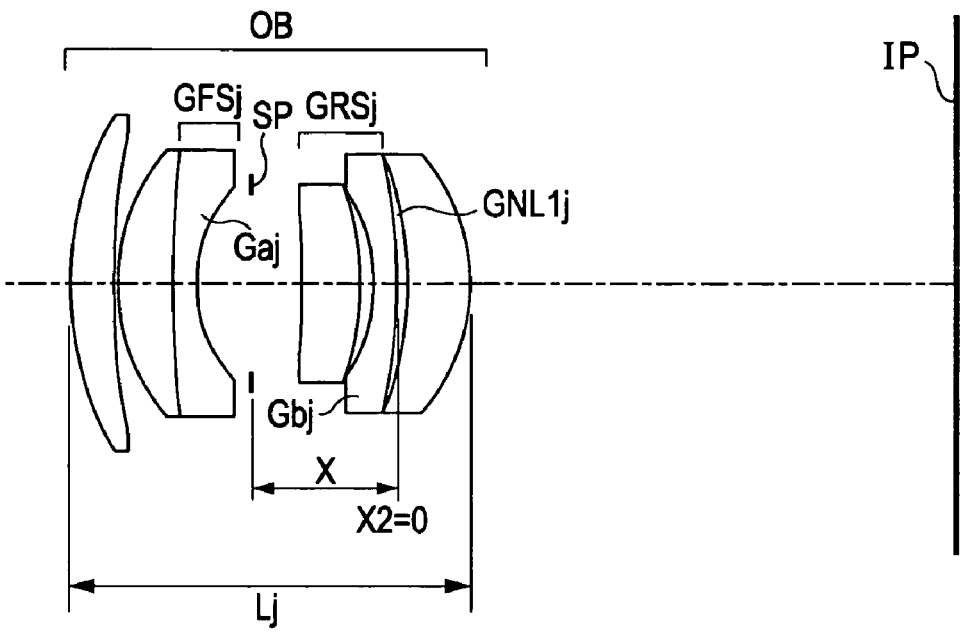
FIG. 19 is an optical sectional view of an optical system according to an example 10 of at least one exemplary embodiment.
Figure 20:
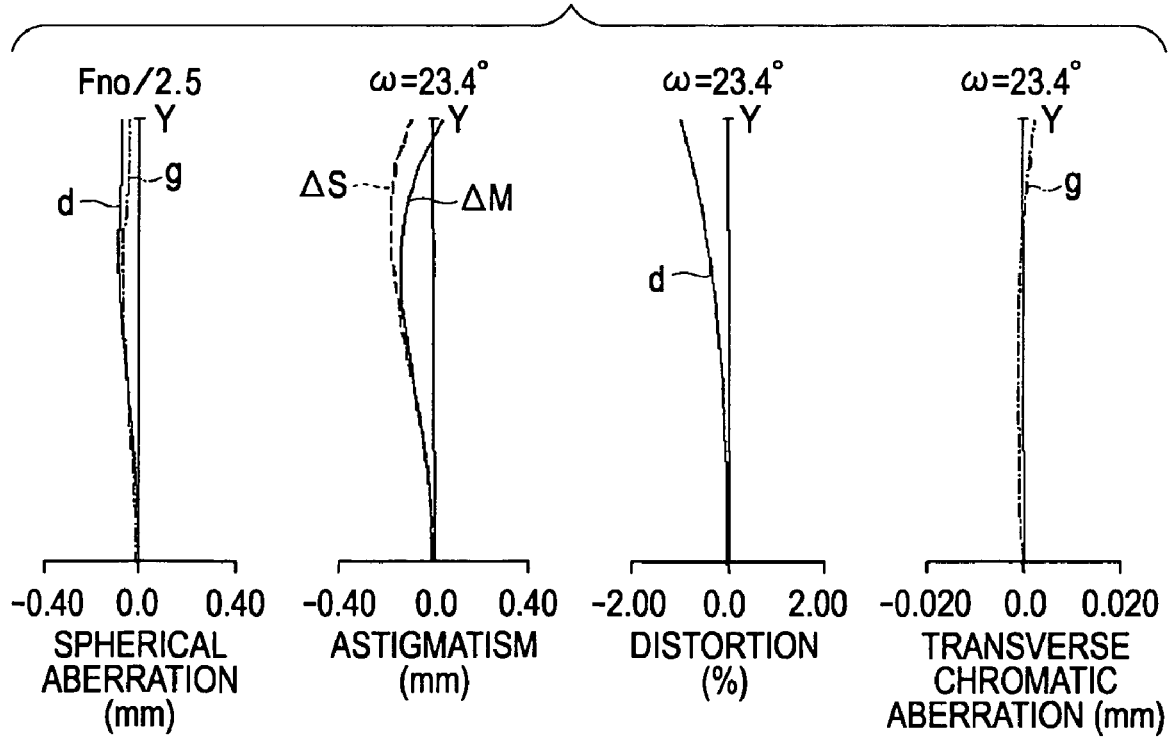
FIG. 20 is an aberration drawing of the optical system according to example 10.

FIG. 19 is a lens-sectional view of an optical system according to an example 10 of at least one exemplary embodiment; FIG. 20 is an aberration drawing of focusing an object at infinity according to example 10.

Figure 21:
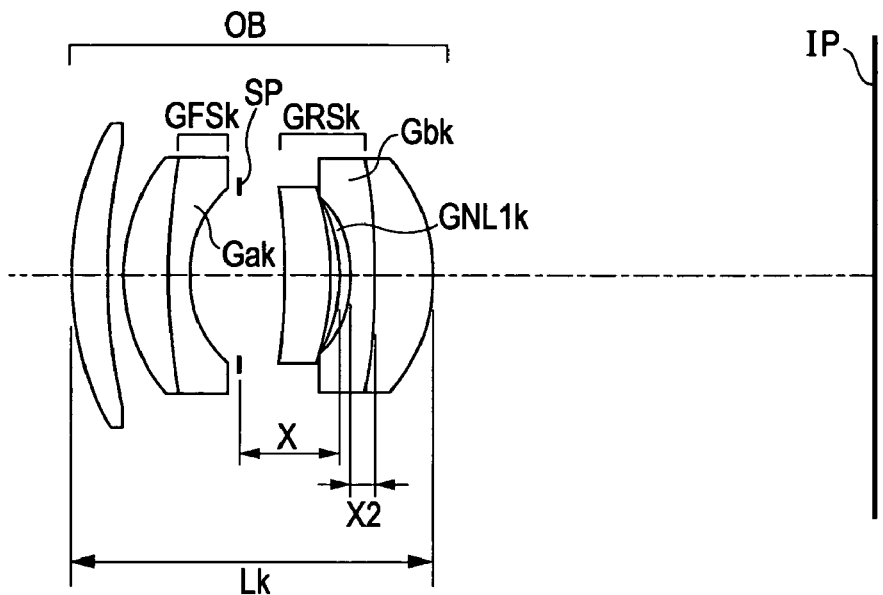
FIG. 21 is an optical sectional view of an optical system according to an example 11 of at least one exemplary embodiment.
Figure 22:
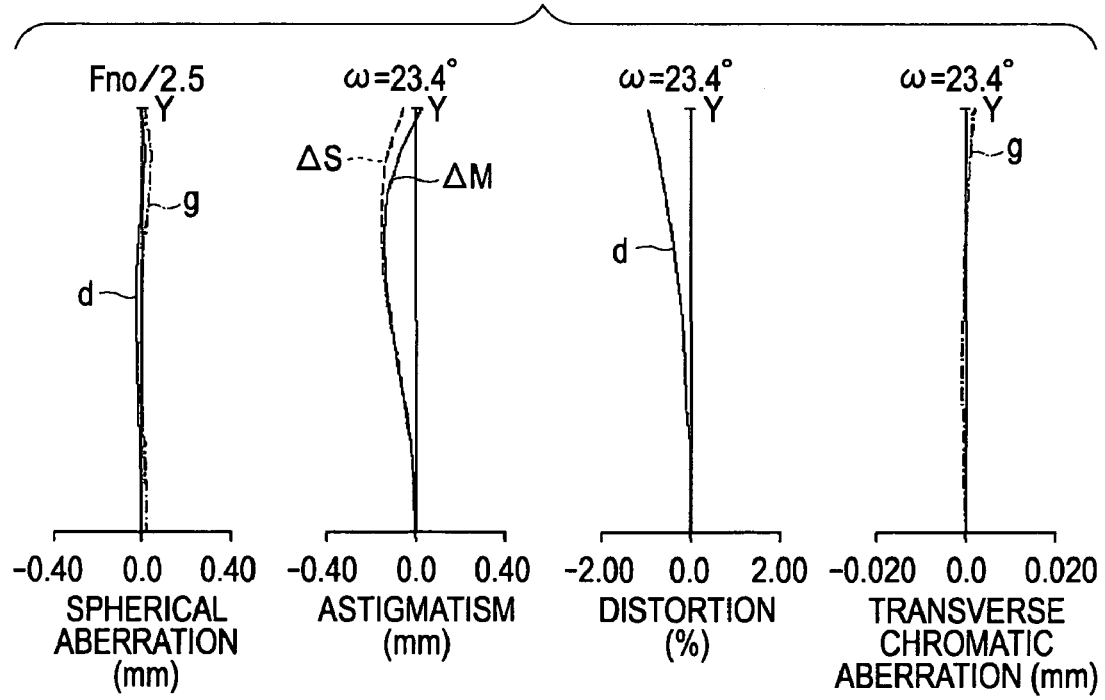
FIG. 22 is an aberration drawing of the optical system according to example 11.

FIG. 21 is a lens-sectional view of an optical system according to an example 11 of at least one exemplary embodiment; FIG. 22 is an aberration drawing of focusing an object at infinity according to example 11.

Figure 23:
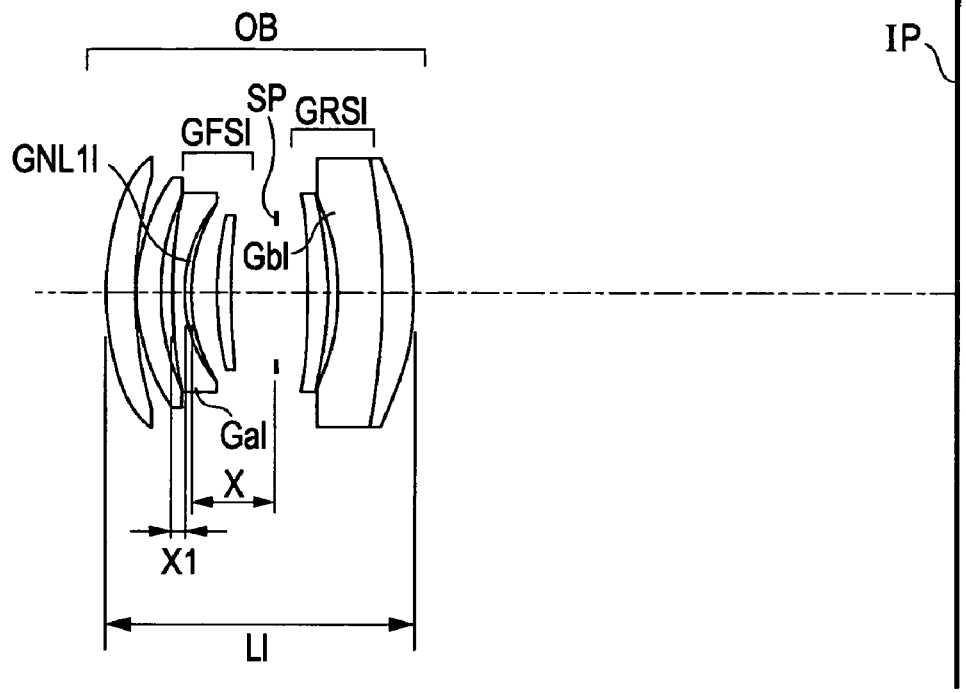
FIG. 23 is an optical sectional view of an optical system according to an example 12 of at least one exemplary embodiment.
Figure 24:
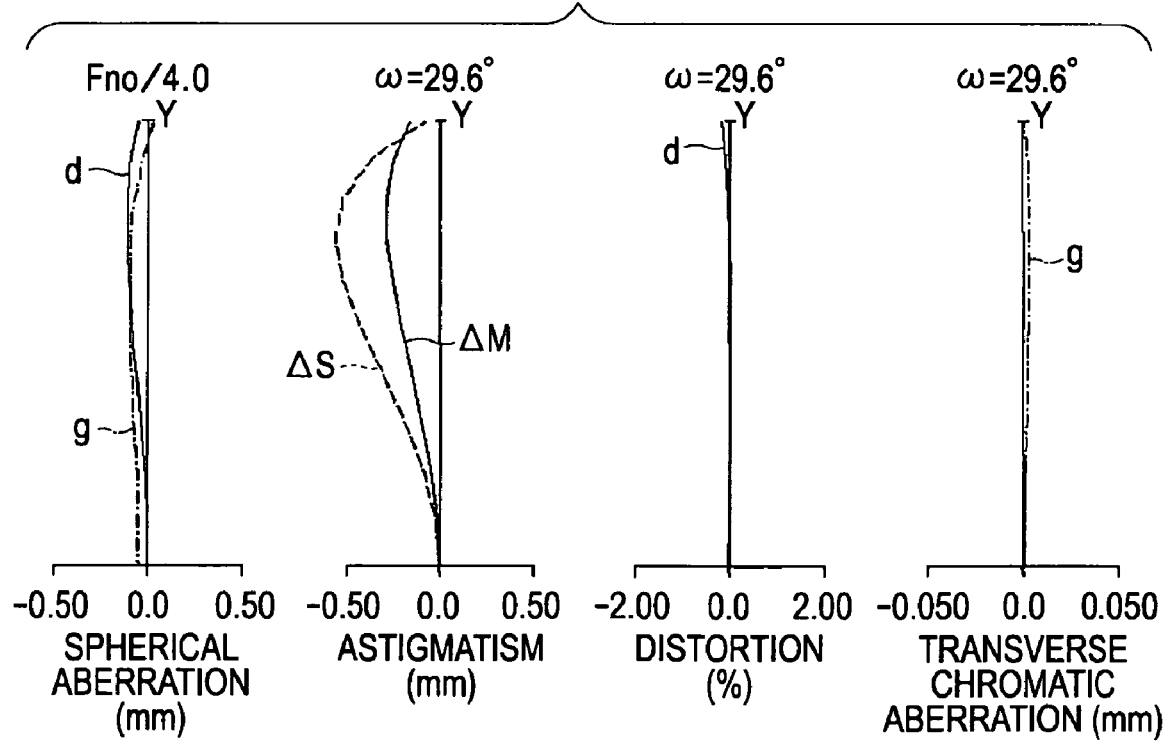
FIG. 24 is an aberration drawing of the optical system according to example 12.

FIG. 23 is a lens-sectional view of an optical system according to an example 12 of at least one exemplary embodiment; FIG. 24 is an aberration drawing of focusing an object at infinity according to example 12.

Examples 1 to 7 are those of a Gauss type lens system; example 8 is that of a Xenoter type lens system; and examples 9 to 12 are those of an ortho-meter type lens system.

In the lens-sectional views, the left is the object side (front side) and the right is the image side (rear side); reference character OB denotes an optical system; and character SP denotes an aperture-stop.

Reference character IP denotes an image plane that corresponds to an image-pickup plane of an image pickup device (e.g., a solid state photoelectric transducer, a CCD sensor, a CMOS sensor, film plane, or other image pickup device as known by one of ordinary skill in the relevant arts and equivalents) when being used as an image-pickup optical system of an optical apparatus (e.g., video camera, a digital still camera a camera for silver films, or other optical apparatus as known by one of ordinary skill in the relevant arts).

In the aberration drawings, reference characters d and g denote a d-line and a g-line, respectively; characters $\Delta M$ and $\Delta S$ represent a meridional image plane and a sagittal image plane, respectively; and the transverse chromatic aberration is expressed by the g-line. Where the Y-axis in the spherical aberration's graph is entrance pupil radius, the Y-axis in the astigmatism's, distortions and chromatic aberration of magnification's graphs is image height. The optical system according to at least one exemplary embodiment can be used in an image-pickup apparatus, such as a digital still camera, a video camera, and a camera for silver film; an observer system, such as a telescope and a binocular; and apparatuses, such as a projector and a copying machine.

An optical system according to at least one exemplary embodiment which can include a plurality of refractive optical elements arranged symmetrically or substantially symmetrically with respect to an aperture-stop, is characterized in that at least one refractive optical element is made of a solid material (at normal temperature and pressure) with a large (high) partial dispersion ratio so as to have refractive power.

In particular, the optical system according to at least one exemplary embodiment can be used for a so-called Gauss-type lens system and the modified Gauss-type optical system, such as a Xenoter type and an ortho-meter type.

The Gauss-type lens system includes at least one positive lens including a meniscus positive lens and a negative lens with a concave surface arranged directly in front of the aperture-stop, which can be arranged adjacent to the object from the aperture-stop in that order from the object side to the image side. The Gauss-type lens system includes a negative lens with a concave surface, which can be arranged directly rearward of the aperture-stop, and at least one positive lens including a meniscus positive lens, which can be arranged adjacent to the image from the aperture-stop in that order from the object side to the image side.

The modified Gauss-type optical system includes a lens system which can include at least one positive lens including a meniscus positive lens and a negative lens with a largely concave face adjacent to the aperture stop, which can be arranged from the aperture stop toward the object side in a sequential order from the object side to the image side, and a negative lens with a largely concave face adjacent to the aperture stop and at least one positive lens including a meniscus positive lens, which can be arranged from the aperture stop toward the image side in a sequential order from the object side to the image side.

When the lens system is described further in detail, the Gauss-type optical system and the modified Gauss-type optical system includes a front unit GF having positive refractive power arranged adjacent to the object from the aperture-stop and a rear unit GR having positive refractive power arranged adjacent to the image. The front unit GF includes a positive lens and a negative lens with a concave surface Ra arranged closest to the aperture-stop, and the rear unit GR includes a negative lens with a concave surface Rb arranged closest to the aperture-stop and a positive lens. The lens system can satisfy the following conditions:

$$0.8 < fF/f < 5.0 \quad (6)$$

$$0.4 < fR/f < 3.0 \quad (7)$$

$$0.2 < fF/fR < 10 \quad (8),$$

where fF and fR are focal lengths of the front unit and the rear unit, respectively; and f is the focal length of the entire system.

The lens system also can satisfy the following conditions:

$$0.1 < Ra/f < 0.5 \quad (9)$$

$$-0.5 < Rb/f < -0.1 \quad (10),$$

where Ra and Rb are radii of curvature of the surfaces Ra and Rb, respectively.

In at least one exemplary embodiment, in Gauss-type lens system, the numerical ranges of the conditional equations (6) to (10) can be as follows:

$$1.0 < fF/f < 5.0 \quad (6a)$$

$$0.4 < fR/f < 1.0 \quad (7a)$$

$$1.0 < fF/fR < 10 \quad (8a)$$

$$0.2 < Ra/f < 0.5 \quad (9a)$$

$$-0.5 < Rb/f < -0.2 \quad (10a).$$

Moreover, in the Gauss-type lens system, in at least one exemplary embodiment the conditional equations are as follows:

$$1.5 < fF/f < 4.5 \quad (6b)$$

$$0.5 < fR/f < 0.95 \quad (7b)$$

$$1.5 < fF/fR < 8 \quad (8b)$$

$$0.22 < Ra/f < 0.45 \quad (9b)$$

$$-0.46 < Rb/f < -0.22 \quad (10b).$$

On the other hand, in the modified Gauss-type lens system, such as a Xenoter type and an ortho-meter type, in at least one exemplary embodiment the conditional equations can be as follows:

$$0.8 < fF/f < 4.0 \quad (6c)$$

$$0.6 < fR/f < 3.0 \quad (7c)$$

$$0.2 < fF/fR < 5.0 \quad (8c)$$

Furthermore, in the modified Gauss-type lens system, at least one exemplary embodiment the conditional equations can be as follows:

$$0.9 < fF/f < 3.0 \quad (6d)$$

$$0.8 < fR/f < 2.5 \quad (7d)$$

$$0.4 < fF/fR < 3.0 \quad (8d)$$

$$0.18 < Ra/f < 0.40 \quad (9d)$$

$$-0.40 < Rb/f < -0.18 \quad (10d).$$

Also, the modified Gauss-type lens systems shown in the examples 8 to 12 can satisfy at least one of the following equations:

$$fFS/f < -0.7 \quad (11)$$

$$fRS/f < -0.7 \quad (12),$$

where fFS is the focal length of the lens group GFS which is part of the front group; fRS is the focal length of the lens group GRS which is part of the rear group; and f is the focal length of the lens entire system.

The lens group GFS includes a negative lens with a concave face adjacent to the aperture stop in the front group and refraction optical devices arranged from the negative lens to the aperture stop. The lens group GRS includes a negative lens with a concave face adjacent to the aperture stop in the rear group and refraction optical devices arranged from the aperture stop to the negative lens.

In the optical system, the refractive optical element having refractive power (optical power=the reciprocal of the focal length) can be formed of a solid material with a large partial dispersion ratio.

The refractive optical element refers to a refractive lens, for example, which generates power by a refraction function and does not include a diffractive optical element, which generates power by a diffraction function.

The solid material refers to a solid when the optical system is used, so that before the optical system is used, such as during manufacturing, the material can be in any state. For example, even it is liquid during manufacturing, the solid cured from this corresponds to the solid material herein.

In the refractive optical element (optical member) used in the optical system according to at least one exemplary embodiment, both the light-incident side (the front and expansion side) and the light-emission side (the rear and contraction side) are refracting surfaces, and at least one of the surfaces has refractive power. The refractive optical element can be made of a material solid at normal temperature and pressure and can satisfy any of the following conditional equations (1) and/or (2):

$$\theta gF - (-1.665 \times 10^{-7} \cdot vd^3 + 5.213 \times 10^{-5} \cdot vd^2 - 5.656 \times 10^{-3} \cdot vd + 0.755) > 0 \quad (1)$$

$$\theta gF - (-1.665 \times 10^{-7} \cdot vd^3 + 5.213 \times 10^{-5} \cdot vd^2 - 5.656 \times 10^{-3} \cdot vd + 1.011) < 0 \quad (2),$$

where $vd$ is the Abbe number and $\theta gF$ is the partial dispersion ratio of the solid material.

Using the refractive optical element made of the solid material satisfying the conditional equations (1) and/or (2), the chromatic aberration is well-corrected over the wide wavelength band from the g-line to C-line.

Furthermore, the solid material can satisfy the following conditional equations (3) and (4):

$$\theta gd - (-1.687 \times 10^{-7} \cdot vd^3 + 5.702 \times 10^{-5} \cdot vd^2 - 6.603 \times 10^{-3} \cdot vd + 1.500) > 0 \quad (3)$$

$$\theta gd - (-1.687 \times 10^{-7} \cdot vd^3 + 5.702 \times 10^{-5} \cdot vd^2 - 6.603 \times 10^{-3} \cdot vd + 1.809) < 0 \quad (4).$$

In addition to the conditional equations (1) and/or (2), by satisfying the conditional equations (3) and/or (4) differently from the conditional equations (1) and/or (2), the chromatic aberration between the g-line and the d-line can be easily corrected. Thereby, the chromatic aberration is more precisely and easily corrected over the wide wavelength band from the g-line to C-line.

In view of the chromatic aberration correction, the solid material can satisfy the equation (5):

$$vd < 60 \quad (5).$$

A specific example of the solid material (also referred to as an optical material below) satisfying the conditional equations (1) and/or (2) includes a resin. Among various resins, a UV-curing resin (Nd=1.635, vd=22.7, θgF=0.69) and N-polyvinyl carbazole (Nd=1.696, vd=17.7, θgF=0.69) are non-limiting examples of optical materials satisfying the conditional equations (1) and/or (2). In addition, the resin is not limited to these as long as it satisfies the conditional equations (1) and/or (2).

The optical material having characteristics different from those of general glass materials includes the following mixtures of nano fine-particles of inorganic oxides dispersed within a synthetic resin: $TiO_2$ (Nd=2.304, vd=13.8), $Nb_2O_5$ (Nd=2.367, vd=14.0), ITO (Nd=1.8581, vd=5.53), $Cr_2O_3$ (Nd=2.2178, vd=13.4), and $BaTiO_3$ (Nd=2.4362, vd=11.3).

Among these inorganic oxides, when fine-particles of $TiO_2$ (Nd=2.304, vd=13.8, θgF=0.87) is dispersed within a synthetic resin in a suitable volumetric ratio, the optical material satisfying the above conditional equations (1) and/or (2) is obtained.

$TiO_2$ is a material having numerous uses, and used in an optical field as a deposition material forming an optical thin film such as an anti-reflection film. In addition to this, the fine-particles of $TiO_2$ are used as a photo-catalyst, a white pigment, and a cosmetic material.

The average diameter of the fine-particles of $TiO_2$ can be about 2 nm to 50 nm in view of the dispersion effect when they are dispersed in a resin according to each exemplary embodiment. In order to suppress aggregation, a dispersion agent can be added.

A medium material, into which $TiO_2$ particles are dispersed, can include a polymer, and the photo-polymerization or the thermal polymerization using a molding die can achieve high mass-productivity.

With regard to characteristics of the polymer optical factor, a polymer with a comparatively large partial dispersion ratio, a polymer with a comparatively small Abbe number, and a polymer satisfying both the characteristics can be satisfactory, so that N-polyvinyl carbazole, styrene, and methyl polymethacrylate (acryl) can be incorporated. According to an exemplary embodiment below mentioned, a UV-curing resin can be used as a host polymer, into which $TiO_2$ particles are dispersed; however, the invention is not limited to this.

A dispersion characteristic $N(\lambda)$ of a mixture of dispersed nano fine-particles can be simply calculated from the following equation derived from the well-known Drude equation:

$$N(\lambda)=[1+V\{N_{TiO}^2(\lambda)-1\}+(1-V)\{N_p^2(\lambda)-1\}]^{1/2} \quad (a),$$

where $\lambda$ is an optional wavelength; $N_{TiO}$ is the refractive index of $TiO_2$; $N_p$ is the refractive index of the polymer; and V is the fraction of the total volume of $TiO_2$ particles relative to the polymer volume.

According to at least one exemplary embodiment, the optical material satisfying the conditional equations (1) and/or (2) is incorporated in a layer (surface) having refractive power provided on a lens or a lens surface of the optical system.

When the refractive surface made of the optical material is shaped to be aspheric, chromatic aberration flare, such as chromatic spherical aberration, can be well-corrected.

If an interface of the optical material is formed to air or to another optical material with comparatively low refractive index, the chromatic aberration can be varied comparatively largely with slight change in curvature of the interface.

The aberration-correction operation of the optical system when the optical material with large partial dispersion ratio and power is used in the optical system will be described.

In the wavelength-dependent characteristics of the refractive index of the optical material, the Abbe number signifies the inclination of the entire dispersion characteristic curve while the partial dispersion ratio represents the curvature of the dispersion characteristic curve.

In the optical material, the refractive index generally decreases with increasing wavelength (the positive Abbe number); the dispersion characteristic curve has downward convexity (the positive partial dispersion ratio); and with decreasing wavelength, the refractive index change relative to the change in wavelength is increased. With decreasing Abbe number and increasing dispersion of the optical material, the partial dispersion ratio is increased, so that the downward convexity of the dispersion characteristic curve is tending to increase.

In the optical material with a large partial dispersion ratio, the wavelength-dependent characteristic curve of the chromatic aberration factor of the lens surface made of the optical material signifies sharp curvature on the shorter wavelength side in comparison a the case using the optical material with a small partial dispersion ratio.

On the other hand, in the optical material with a small partial dispersion ratio, the wavelength-dependent characteristic curve of the chromatic aberration factor of the lens surface made of the optical material nearly has the linearity over the entire wavelength band.

The partial dispersion ratio of general optical materials, such as a glass material, changes substantially linearly relative to the Abbe number. The optical material having characteristics deviating from this linear change signifies the extraordinary partial dispersion. The optical material with the extraordinary partial dispersion includes fluorite; however, the fluorite has small dispersion so as to substantially uniformly change relative to the Abbe number.

When the optical material with the extraordinary partial dispersion is used for a lens having power, the wavelength-dependent characteristic curve of the chromatic aberration factor of the lens surface shows more significant linearity (small partial dispersion ratio) or more sharp curvature (large partial dispersion ratio) in comparison with a case using the general glass material.

In view of the high linearity of the wavelength-dependent characteristic curve of the chromatic aberration factor, the diffractive optical element has a very small partial dispersion ratio. In the optical system using the diffraction optical element, the chromatic aberration can be well-corrected over the entire wavelength band. However, with respect to the effect on light, the diffraction and the refraction are entirely different from each other. The general optical material, as mentioned above, can have a positive Abbe number, and its dispersion characteristic curve signifies more or less downward convexity.

Whereas, in the diffractive optical element, the refractive index on the large wavelength side is adversely larger than that on the small wavelength side, and the change in refractive index relative to the wavelength also becomes uniform. Hence, the Abbe number of the diffractive optical element can have a negative value such as −3.45, and its dispersion characteristic curve signifies linearity.

In the optical system using such a diffractive optical element by making the most of the characteristics entirely different from those of general refractive materials, by canceling the comparatively large chromatic aberration generated in parts other than the diffractive optical element with the diffraction part, the chromatic aberration can be well-corrected over the entire wavelength band.

Using the optical material with a very small partial dispersion ratio in such a manner, the chromatic aberration can be well-corrected over the entire wavelength band with the entire optical system.

According to at least one exemplary embodiment which will be described later, using the optical material with a partial dispersion ratio larger that of a general glass material among extraordinary partial dispersion materials, the chromatic aberration is well-corrected over the entire wavelength band with the entire optical system.

The difference between a lens using the optical material with a large partial dispersion ratio and a lens using that with a small partial dispersion ratio is that the curvature on the small wavelength side of the wavelength-dependent characteristic curve of the chromatic aberration factor on the lens surface is whether slow or sharp.

This curvature on the small wavelength side is due to the dispersion characteristic bending of the optical system. An optical material herein with the refractive index of the d-line being equal to the Abbe number will be described. When a material with a large partial dispersion ratio, a material with a normal partial dispersion ratio (general optical material), and a material with a small partial dispersion ratio are used for lenses having equal power, if differences between chromatic factors on the small wavelength side and the large wavelength side are $\Delta NH$, $\Delta NM$, and $\Delta NL$, respectively, the relationship between them can satisfy the following equation:

$$\Delta NH > \Delta NM > \Delta NL > 0 \quad (b).$$

An optical system including two lenses, one of which is made of an extraordinary partial dispersion material, will be described.

First, if a material with a normal partial dispersion ratio and a material with a small partial dispersion ratio are used for two combined lenses having equal power, respectively, the difference between chromatic factors on the small wavelength side and the large wavelength side of this optical system can be ΔNM+ΔNL. This is reduced by ΔNM−ΔNL when compared with the two same lenses with the normal partial dispersion ratio.

Namely, when compared with the two same lenses with the normal partial dispersion ratio, the chromatic aberration can be reduced.

Then, the combination of a material with a normal partial dispersion ratio with a material with a large partial dispersion ratio will be described. The difference between chromatic factors on the small wavelength side and the large wavelength side of this optical system can be ΔNM+ΔNH.

This is increased by ΔNH−ΔNN, when compared with the two lenses with the normal partial dispersion ratio. Hence, if it is assumed that the chromatic aberration on the small wavelength side be reduced when using a material with slow curvature and a small partial dispersion ratio, the chromatic aberration on the small wavelength side is conversely increased, when using a material with sharp curvature and a large partial dispersion ratio. However, this is a case where a material with a large partial dispersion ratio and a material with a small partial dispersion ratio are used with the same power.

In this state, the power sign condition of lens made of a material with a large partial dispersion ratio is reversed. That is, the power sign condition of one of the two lenses arranged is reversed so as to use the material with a large partial dispersion ratio therefor. Then, if the material with a large partial dispersion ratio is used, the chromatic aberration on the small wavelength side can be conversely reduced by ΔNH−ΔNN, when compared with the two lenses with the normal partial dispersion ratio.

Even for materials where the normal partial dispersion ratios are combined, it can be difficult to simultaneously correct the chromatic aberrations of the curvature component and the inclination component of the wavelength-dependent characteristic curve of the chromatic aberration factor over the entire wavelength band. Then, one can suitably use a material with a small partial dispersion ratio, which can reduce the curvature component on the small wavelength side, the chromatic aberration can be reduced. However, in view of the reduction of the chromatic aberration on the small wavelength side, if a material with a large partial dispersion ratio is used with the power of the reverse sign condition to that of a material with a small partial dispersion ratio, the same thing is possible. When the sign condition of the power is different, in a material with a large partial dispersion ratio and a material with a small partial dispersion ratio, even on other than the small wavelength side, the operation is reversed. Therefore, in order to balance that, the movement of other glass materials of the optical system can be reversed.

This will be described by exemplifying the achromatism in a Gauss-type optical system (lens system) including at least one refractive optical part GNL using a material with a large partial dispersion ratio and at least one refractive optical part G made of materials other than that.

In a substantially symmetric Gauss-type lens system, such as the Xenoter type and the ortho-meter type, the refractive optical part G having negative power (refractive power) is generally arranged in the vicinity of the diaphragm. Since the refractive optical part G cancels the chromatic aberration of the other comparatively large number of lenses having positive power, the chromatic aberration factor of the refractive optical part G occupies a high fraction in the entire lens system. Thus, the chromatic aberration can be reduced over the entire lens system by reducing the chromatic aberration of the refractive optical part G or by canceling the aberration with other optical materials.

In a substantially symmetric lens system, the material of negative lenses forming the refractive optical part G is generally selected from materials with comparatively large partial dispersion ratio.

Since a material with a large partial dispersion ratio generally also has a high dispersion, the entire inclination of the wavelength-dependent characteristic curve of the chromatic aberration factor of the refractive optical part G can be changed while bending larger than the original state so as to cancel or reduce aberrations due to other positive lenses.

In this state, appropriate power can be applied to the refractive optical part GNL. However, when the refractive optical part GNL is made of a general optical material with a partial dispersion ratio uniform relative to the Abbe number, the refractive optical part GNL contributes to the curvature component and the inclination component of the wavelength-dependent characteristic curve of the chromatic aberration factor of the refractive optical part G simultaneously at a certain ratio. Hence, the refractive optical part GNL cannot cancel both components simultaneously.

Whereas, when the refractive optical part GNL is made of a material with a larger partial dispersion ratio in comparison with a general optical material, the refractive optical part GNL mainly contributes to the curvature component of the whole wavelength-dependent characteristic curve of the chromatic aberration factor of the refractive optical part G so as to mainly cancel and/or reduce the curvature component.

Thus, the curvature component of the whole wavelength-dependent characteristic curve of the chromatic aberration factor can be distributed to the refractive optical part GNL while the inclination component can be distributed to other lenses of the refractive optical part G, so that both the components can be simultaneously cancelled and/or reduced independently of each other. Thus, the design degree of freedom is increased, facilitating the aberration correction.

If the absolute value of the Abbe number of the material of the refractive optical part GNL is small, i.e., large dispersion, the chromatic aberration can be corrected independently.

Then, this will be described with reference to an axial chromatic aberration factor and a transverse chromatic aberration factor of a lens surface.

The change in power Δφ of a refractive lens surface is expressed as follows:

$$\Delta L \propto \Delta\phi/\nu \qquad (c)$$

$$\Delta T \propto \Delta\phi/\nu(d),$$

where ΔL is the change in axial chromatic aberration factor of a lens surface, and ΔT is the change in transverse chromatic aberration factor of the lens surface.

As is apparent from equations (c) and (d), the change in each aberration factor is increased with decreasing absolute value of the Abbe number (i.e., increasing dispersion). Hence, if using a large dispersion material with a small absolute value of the Abbe number, the change in power for obtaining necessary chromatic aberration is small than might be expected.

On an aberration theory, this means that the chromatic aberration can be controlled without largely influencing the spherical aberration, the coma, and the astigmatism, so that the independence of the chromatic aberration correction and/or reduction is increased. Conversely, if the small dispersion material is used, the change in power for obtaining necessary chromatic aberration is large, so that various aberrations such as spherical aberration are largely changed therewith, reducing the independence of the chromatic aberration correction. Thus, it can be useful in correcting the aberration that the lens refractive surface of at least one of lenses forming the optical system can be made of a large dispersion material. In particular though not exclusively, in the substantially symmetric optical system, one or more refracting lens faces formed of a high dispersion material be arranged in the respective object and image sides from the aperture stop.

Since the refractive optical part GNL is used by combining it with general optical materials, the partial dispersion ratio of a material used in the refractive optical part GNL can be different from that of general optical materials; however, too much difference is disagreeable.

If a material too much different from general optical materials is used for a lens, the curvature on the small wavelength side of the wavelength-dependent characteristic curve of the chromatic aberration factor of this lens surface can become sharp. For canceling the sharp curvature, the power of other lenses can also be increased, so that the aberration correction and/or reduction is difficult by largely influencing the spherical aberration, the coma, and the astigmatism.

That is, the refractive optical part GNL can be an optical material with the partial dispersion ratio larger than that of general optical materials as well as not too much difference from that of general optical materials is important. The conditional equations (1) to (4) express the relationship between the Abbe number and the partial dispersion ratio for well-correcting the chromatic aberration on the basis of the principle described above.

The numerical range of the conditional equation (1) in at least one exemplary embodiment can have the following range:

$$\theta gF-(-1.665\times10^{-7}\cdot vd^3+5.213\times10^{-5}\cdot vd^2-5.656\times10^{-3}\cdot vd+0.662)>0 \quad (1a)$$

In addition to satisfy the conditional equations (1) or (1a), the numerical range of the conditional equation (2) in at least one exemplary embodiment can have the following range:

$$\theta gF-(-1.665\times10^{-7}\cdot vd^3+5.213\times10^{-5}\cdot vd^2-5.656\times10^{-3}\cdot vd+0.870)<0 \quad (2a)$$

The following range can also be used by at least one exemplary embodiment:

$$\theta gF-(-1.665\times10^{-7}\cdot vd^3+5.213\times10^{-5}\cdot vd^2-5.656\times10^{-3}\cdot vd+0.825)<0 \quad (2b)$$

The numerical range of the conditional equation (3) in at least one exemplary embodiment can have the following range:

$$\theta gd-(-1.687\times10^{-7}\cdot vd^3+5.702\times10^{-5}\cdot vd^2-6.603\times10^{-3}\cdot vd+1.513)>0 \quad (3a)$$

In addition to satisfy the conditional equations (3) or (3a), the numerical range of the conditional equation (4) at least one exemplary embodiment can have the following range:

$$\theta gd-(-1.687\times10^{-7}\cdot vd^3+5.702\times10^{-5}\cdot vd^2-6.603\times10^{-3}\cdot vd+1.620)<0 \quad (4a)$$

The following range can also be used by at least one exemplary embodiment:

$$\theta gd-(-1.687\times10^{-7}\cdot vd^3+5.702\times10^{-5}\cdot vd^2-6.603\times10^{-3}\cdot vd+1.580)<0 \quad (4b)$$

The numerical range of the conditional equation (5) in at least one exemplary embodiment can have the following range:

$$vd<45 \quad (5a)$$

The following range can also be used in at least one exemplary embodiment:

$$vd<30 \quad (5b)$$

The optical material satisfying the conditional equations (1) to (5) can satisfy the following condition:

$$|dn/dT|<2.5\times10^{-4}(1/°\text{ C.}) \quad (13)$$

where $|dn/dT|$ is the absolute value of the rate of the change in d-ray refractive index relative to the temperature from 0° C. to 40° C.

If deviated from the range of the conditional equation (13), in the optical system it can be difficult to maintain good optical performances in the temperature range from 0° C. to 40° C.

In a lens system roughly symmetrical with respect to an aperture-stop, using the bilateral symmetry between the object side lens unit and the image side lens unit, axial and off-axial various aberrations are corrected. Thus, it can be useful to correct and/or reduce the aberration without destroying the symmetry. In particular though not exclusively, the lens system, such as the Xenoter type and the ortho-meter type, can be frequently used at a wide angle of view, so that changes in aberration of axial and off-axial light are increased.

In a lens in the vicinity of the aperture-stop, the passing position of the off-axial beam is generally low from the optical axis, so that the lens mainly affects the spherical aberration and the axial chromatic aberration and scarcely affects the off-axial aberration.

Hence, using an optical material with aberrant dispersion for a lens in the vicinity of the aperture-stop, the aberration of the entire system can be reduced with scarcely influencing the off-axial aberration in a well-balanced state.

In a roughly symmetrical lens, using a material with large dispersion and large partial dispersion for a negative lens in the vicinity of the aperture-stop, the chromatic aberration can be thereby well-corrected.

Specifically, in a substantially symmetric optical system in accordance with at least one exemplary embodiment, the chromatic aberration can be well corrected by satisfying the following equations:

$$va<40 \quad (14)$$

$$vb<40 \quad (15)$$

where va is the Abbe number of the negative lens with a concave face adjacent to the image side in the front group, and vb is the Abbe number of the negative lens with a concave face adjacent to the object side in the rear group. Also, in the substantially symmetric optical system, emanative flare apt to generate due to a strong concave face in the vicinity of the aperture stop, so that if the refracting power in the vicinity of the concave face is increased, the higher order component of aberration is difficult to be reduced. Hence, in a wide angle of view lens, which is apt to generate the higher order component of aberration, the power of the lens arranged in the vicinity of the aperture stop can be suppressed.

The conditional equations (11) and (12) mentioned above optimally establish the power in the vicinity of the aperture stop on the basis of the principle mentioned above. The followings are further numerical ranges of the conditional equations (11) and (12) that can be used by at least one exemplary embodiment:

$$fFS/f < -0.8 \quad (11a)$$

$$fRS/f < -0.8 \quad (12a)$$

The arrangement of the refractive optical part GNL for well-correcting the chromatic aberration on the basis of the optical principle described above is specified by the following conditional equation (16):

$$X/L < 0.4 \quad (16),$$

where in the optical system, L is the distance from the refractive surface closest to the object to the refractive surface closest to the image, and X is the distance from the refractive surface of the refractive optical part GNL adjacent to an intersection P of the optical axis and a paraxial chief ray to the intersection P.

The paraxial chief ray refers to a paraxial ray passing through the intersection of the entrance pupil and the optical axis of the optical system among rays incident on the optical axis at 45° when the focal length of the entire optical system is normalized to be 1. In the incident angle on the optical system, the clockwise direction from the optical axis is to be positive while the counterclockwise direction is to be negative. The object is assumed to be on the left side of the optical system, so that the light incident on the optical system from the object proceeds from the left to the right.

Thereby, using the refractive optical part GNL, the chromatic aberration is effectively corrected and/or reduced.

The numerical range of the conditional equation (16) in at least one exemplary embodiment can have the following range:

$$X/L < 0.3 \quad (16a).$$

If the refractive optical part G and the refractive optical part GNL are arranged apart in the optical axial direction, the balance of the canceling relationship between the curvature component and the inclination component of the entire wavelength-dependent characteristic curve of the chromatic aberration factor is destroyed. Thus, other aberrations, such as the spherical aberration, the astigmatic difference, and the curvature of the field, are deteriorated, so that the aberration of the entire optical system is difficult to reduce.

The refractive optical part GNL can be arranged in the vicinity of the aperture-stop as well as in the vicinity of the refractive optical part G.

For obtaining good optical performances, the conditional equation (17) can be satisfied when the refractive optical part GNL is arranged adjacent to the object from the aperture-stop, and the conditional equation (18) can be satisfied when the refractive optical part GNL is arranged adjacent to the image from the aperture-stop:

$$X1/L < 0.2 \quad (17)$$

$$X2/L < 0.2 \quad (18),$$

where when the refractive optical part GNL is arranged adjacent to the object from the aperture-stop, X1 is the distance from the refractive optical part arranged adjacent to the object from the intersection P having the strongest refractive power (in a cemented lens, the refractive surface arranged adjacent to the object from G1) to the refractive surface adjacent to the refractive optical part G1 of the refractive optical part GNL; when the refractive optical part GNL is arranged adjacent to the image from the aperture-stop, X2 is the distance from the refractive optical part G2 arranged adjacent to the image from the intersection P having the strongest refractive power to the refractive surface adjacent to the refractive optical part G2 of the refractive optical part GNL.

The numerical range of the refractive power φGNL of the refractive optical part GNL in at least one exemplary embodiment can have better optical performances by satisfying the following equation:

$$\phi GNL > 0 \quad (19).$$

Specific examples of the optical system satisfying the conditional equations (1) to (19) will be described.

As materials satisfying the conditional equations (1) to (5) and (13), a UV-curing resin 1 and fine-particles of $TiO_2$ dispersed within a UV-curing resin 2, which is a host polymer, are used herein although any material as known by one of ordinary skill satisfying the relevant equations can be used in exemplary embodiment.

NUMERICAL EXAMPLE 1

FIG. 1 is a lens sectional view of an optical system of a numerical example 1, in which a refractive optical element GNL1a, as a refractive optical part made, for example, of a UV-curing resin 1, is used in a Gauss-type optical system (lens system) with about a 50 mm focal length and about a 1.4 F number. Note that in the non limiting examples (e.g. numerical examples) any material specified for use in the lenses should be interpreted as non limiting, thus other materials as known by one of ordinary skill in the relevant arts can be used and their equivalents.

FIG. 2 is an aberration drawing of the optical system of the numerical example 1 in an in-focus state of an object at infinity.

In the aberration drawing, reference characters d and g denote a d-line and a g-line, respectively; characters ΔM and ΔS represent a meridional image plane of the d-line and a sagittal image plane of the d-line, respectively; the transverse chromatic aberration is expressed by the g-line; character Fno denotes an F number; and character ω represents a half field angle. Where the Y-axis in the spherical aberration's graph is entrance pupil radius, the Y-axis in the astigmatism's, distortions and chromatic aberration of magnification's graphs is image height.

These are the same as in the following aberration drawings.

In the optical system of the numerical example 1, by introducing the refractive optical element GNL1a made, for example, of the UV-curing resin 1 in the vicinity of an aperture-stop SP, the axial chromatic aberration is mainly well-corrected.

NUMERICAL EXAMPLE 2

FIG. 3 is a lens sectional view of an optical system of a numerical example 2, in which a refractive optical element (layer) GNL1b, as a refractive optical part made of, for example, a mixture of $TiO_2$ fine particles dispersed into a UV-curing resin 2, is used in the Gauss-type optical system with about a 50 mm focal length and about a 1.4 F number. Reference character SP denotes an aperture-stop. FIG. 4 is an aberration drawing of the optical system of the numerical example 2 in an in-focus state of an object at infinity.

In the optical system of the numerical example 2, by introducing the refractive optical element GNL1b made of, for example, dispersed $TiO_2$ fine particles in the vicinity of an aperture-stop SP as well as at a position adjacent to the object from the aperture-stop SP, the axial chromatic aberration is mainly well-corrected.

NUMERICAL EXAMPLE 3

FIG. 5 is a lens sectional view of an optical system of a numerical example 3, in which the refractive optical element GNL1c, as a refractive optical part made of, for example, a mixture of $TiO_2$ fine particles dispersed into the UV-curing resin 2, is used in the Gauss-type optical system with about a 50 mm focal length and about a 1.4 F number. Reference character SP denotes an aperture-stop.

FIG. 6 is an aberration drawing of the optical system of the numerical example 3 in an in-focus state of an object at infinity.

In the optical system of the numerical example 3, by introducing the refractive optical element (layer) GNL1c made of, for example, dispersed $TiO_2$ fine particles in the vicinity to the utmost of the aperture-stop SP, the axial chromatic aberration is mainly well-corrected.

NUMERICAL EXAMPLE 4

FIG. 7 is a lens sectional view of an optical system of a numerical example 4, in which the refractive optical part GNL1d, as a refractive optical part made of, for example, a mixture of $TiO_2$ fine particles dispersed into the UV-curing resin 2, is used in the Gauss-type optical system with about a 50 mm focal length and about a 1.4 F number. Reference character SP denotes an aperture-stop.

FIG. 8 is an aberration drawing of the optical system of the numerical example 4 in an in-focus state of an object at infinity.

In the optical system of the numerical example 4, by introducing the refractive optical element (layer) GNL1d made of, for example, dispersed $TiO_2$ fine particles into the cladding surface of a cemented lens in the vicinity of the aperture-stop SP, the axial chromatic aberration is mainly well-corrected so as to have an optical system excellent in environment resistance.

NUMERICAL EXAMPLE 5

FIG. 9 is a lens sectional view of an optical system of a numerical example 5, in which the refractive optical element (layer) GNL1e, as a refractive optical part made of, for example, a mixture of $TiO_2$ fine particles dispersed into the UV-curing resin 2, is used in the Gauss-type optical system with about a 50 mm focal length and about a 1.4 F number. An interface to air of the refractive optical element GNL1e is aspheric. Reference character SP denotes an aperture-stop.

FIG. 10 is an aberration drawing of the optical system of the numerical example 5 in an in-focus state of an object at infinity.

In the optical system of the numerical example 5, the refractive optical part GNL1e made of, for example, dispersed $TiO_2$ fine particles is introduced in the vicinity of the aperture-stop SP as well as at a position adjacent to the image from the aperture-stop SP. By shaping the interface to air of the refractive optical element (layer) GNL1 to be aspheric, an optical system is obtained in that the off-axial spherical aberration and other aberrations are corrected in a well-balanced state.

NUMERICAL EXAMPLE 6

FIG. 11 is a lens sectional view of an optical system of a numerical example 6, in which the refractive optical element GNL1f, as a refractive optical part made of, for example, a mixture of $TiO_2$ fine particles dispersed into the UV-curing resin 2, is used in a Gauss-type optical system with about a 50 mm focal length and about a 1.8 F number. Reference character SP denotes an aperture-stop. FIG. 12 is an aberration drawing of the optical system of the numerical example 6 in an in-focus state of an object at infinity.

In the optical system of the numerical example 6, by introducing a lens of the refractive optical element GNL1f made of, for example, dispersed $TiO_2$ fine particles in the vicinity of the aperture-stop SP, the axial chromatic aberration is mainly well-corrected.

NUMERICAL EXAMPLE 7

FIG. 13 is a lens sectional view of an optical system of a numerical example 7, in which the refractive optical element GNL1g, as a refractive optical part made of, for example, a mixture of $TiO_2$ fine particles dispersed into the UV-curing resin 2, is used in a Gauss-type optical system for reading a picture. Reference character SP denotes an aperture-stop. FIG. 14 is an aberration drawing of the optical system of the numerical example 7 in a magnification of about −0.22×.

In the optical system of the numerical example 7, by introducing a lens of the refractive optical element GNL1g made of, for example, dispersed $TiO_2$ fine particles in the vicinity of the aperture-stop SP, the chromatic aberration is well-corrected over a wide angle of field.

NUMERICAL EXAMPLE 8

FIG. 15 is a lens sectional view of an optical system of a numerical example 8, in which the refractive optical element GNL1h includes a UV curing resin 1 is used in a Xenoter type optical system with an F-number of about 3.0 for reading a picture. FIG. 16 is an aberration drawing of the optical system of the numerical example 8 in a magnification of about −0.11×.

In the optical system of the numerical example 8, by introducing the refractive optical element GNL1 made of, for example, the UV curing resin 1 in a cladding surface of a cemented lens in the vicinity of the aperture-stop SP, the axial chromatic aberration is mainly well-corrected while environment resistance can be improved.

NUMERICAL EXAMPLE 9

FIG. 17 is a lens sectional view of an optical system of a numerical example 9, in which the refractive optical element GNL1i includes the UV curing resin 1 is used in an ortho-meter type optical system with a focal length of about 55 mm and an F-number of about 4.1. An interface to air of the refractive optical element GNL1 is aspheric. Reference character SP denotes an aperture-stop. FIG. 18 is an aberration drawing of the optical system of the numerical example 9 in an in-focus state of an object at infinity.

In the optical system of the numerical example 9, by introducing the refractive optical element GNL1i made of, for example, the UV curing resin 1 at a position in the vicinity of the aperture-stop SP as well as adjacent to the image side of the aperture stop, the off-axial spherical aberration and other aberrations are corrected in a well-balanced state.

NUMERICAL EXAMPLE 10

FIG. 19 is a lens sectional view of an optical system of a numerical example 9, in which the refractive optical element GNL1j includes the UV curing resin 1 is used in an ortho-meter type optical system with a focal length of about 50 mm and an F-number of about 2.5. Reference character SP denotes an aperture-stop. FIG. 20 is an aberration drawing of the optical system of the numerical example 10 in an in-focus state of an object at infinity.

In the optical system of the numerical example 10, by introducing the refractive optical element (layer) GNL1j made of, for example, the UV curing resin 1 in a cladding surface of a cemented lens in the vicinity of the aperture-stop SP, the axial chromatic aberration is mainly well-corrected while environment resistance can be improved.

NUMERICAL EXAMPLE 11

FIG. 21 is a lens sectional view of an optical system of a numerical example 9, in which the refractive optical element GNL1k includes the mixture of the $TiO_2$ fine-particles mixed with the UV-curing resin 2 is used in an ortho-meter type optical system with a focal length of about 50 mm and an F-number of about 2.5. Reference character SP denotes an aperture-stop. FIG. 22 is an aberration drawing of the optical system of the numerical example 11 in an in-focus state of an object at infinity.

In the optical system of the numerical example 11, by introducing the refractive optical element (layer) GNL1k made of, for example, the mixture of the $TiO_2$ fine-particles mixed with the UV-curing resin 2 in the vicinity of the aperture-stop SP, the axial chromatic aberration is mainly well-corrected.

NUMERICAL EXAMPLE 12

FIG. 23 is a lens sectional view of an optical system of a numerical example 12, in which the refractive optical element (layer) GNL1l which includes N-polyvinyl carbazole is used in an ortho-meter type optical system with a focal length of about 100 mm and an F-number of about 4.0. Reference character SP denotes an aperture-stop. FIG. 24 is an aberration drawing of the optical system of the numerical example 12 in an in-focus state of an object at infinity.

In the optical system of the numerical example 12, by introducing the refractive optical element GNL1l made of, for example, N-polyvinyl carbazole in the vicinity of the aperture-stop SP, the axial chromatic aberration is mainly well-corrected.

Specific numerical data of the numerical examples 1 to 12 will be shown below. In each numerical example, code i denotes an order from the object; code Ri a radius of curvature of $i^{th}$ optical surface ($i^{th}$ face); code Di an axial space between $i^{th}$ face and $(i+1)^{th}$ face; and codes Ni and vi a d-ray refractive index and a d-ray Abbe number, respectively, of $i^{th}$ optical member (excluding a lens (layer) made of, for example, a resin and dispersed $TiO_2$ fine particles). The d-line refractive index and the d-line Abbe number are separately shown in NGNLj and vGNLj (j=1, 2, . . . ), respectively. Character f denotes a focal length; character Fno an F number; and character ω a half field angle.

An aspheric shape is expressed by [Numerical Formula 1']:

$$x(h) = \frac{(1/r)h^2}{1 + \sqrt{\{1-(1+k)(h/r)^2\}}} + Bh^4 + Ch^6 + Dh^8 + Eh^{10}\cdots$$ [Numerical Formula 1']

where X is a displacement from a surface apex in the optical axial direction; h is a height from the optical axis in a direction perpendicular to the optical axis; r is a paraxial radius of curvature; k is a conic constant; and B, C, D, E . . . are aspheric factors of each order. In addition, (E±XX) in each aspheric factor means ($\times 10^{\pm XX}$).

In the numerical example 1, the UV-curing resin 1 is used as a simple substance. In the numerical examples 2 to 7, $TiO_2$ is used in a state dispersed into the UV-curing resin 2, which is a host polymer, at a volume fraction 7%. The refractive index of the $TiO_2$ dispersed fine-particles is calculated using the above-equation (a).

Table 1 shows d-line, g-line, C-line, and F-line refractive indexes, Abbe numbers, and partial dispersion ratios of the UV-curing resin 1 and the mixture of the $TiO_2$ fine-particles mixed with the UV-curing resin 2 at a volume fraction 7% used in the examples.

Table 2 shows d-line, g-line, C-line, and F-line refractive indexes, Abbe numbers, and partial dispersion ratios of the UV-curing resin 2 and a simple substance of $TiO_2$.

Table 3 shows the relationship between the above conditional equations (7), (8a), (8b), (9), and (10a) to (10e) and the numerical examples.

In the aberration drawings, codes g and d denote wavelengths of the g-line and the d-line, respectively; codes R, G, and B represent 620 nm, 546.07 nm (e-ray), 460 nm, respectively; and characters ΔM and ΔS represent a meridional image plane and a sagittal image plane, respectively.

NUMERICAL EXAMPLE 1 f = 51.8 Fno = 1.41 2ω = 45.2°

| | | | |
|---|---|---|---|
| R1 = 54.846 | D1 = 4.74 | N1 = 1.8388 | v1 = 44.3 |
| R2 = 1059.047 | D2 = 1.50 | | |
| R3 = 30.372 | D3 = 3.56 | N2 = 1.8850 | v2 = 41.0 |
| R4 = 49.954 | D4 = 1.71 | | |
| R5 = 132.860 | D5 = 4.99 | N3 = 1.6766 | v3 = 29.9 |
| R6 = 19.377 | D6 = 7.49 | | |
| R7 = ∞ (STOP) | D7 = 8.19 | | |
| R8 = −17.653 | D8 = 1.80 | N4 = 1.8442 | v4 = 23.5 |
| R9 = −149.083 | D9 = 3.91 | N5 = 1.6604 | v5 = 56.8 |
| R10 = −31.705 | D10 = 1.00 | NGNL1 = 1.6356 | vGNL1 = 22.7 |
| R11 = −26.006 | D11 = 0.15 | | |
| R12 = −124.728 | D12 = 4.66 | N6 = 1.8813 | v6 = 41.2 |
| R13 = −30.469 | D13 = 0.15 | | |
| R14 = 104.212 | D14 = 3.29 | N7 = 1.7800 | v7 = 50.0 |
| R15 = −226.181 | | | |

NUMERICAL EXAMPLE 2 f = 51.8 Fno = 1.41 2ω = 45.2°

| | | | |
|---|---|---|---|
| R1 = 57.969 | D1 = 4.76 | N1 = 1.7951 | v1 = 48.3 |
| R2 = −2707.826 | D2 = 1.37 | | |

-continued

| f = 51.8 Fno = 1.41 2ω = 45.2° | | | |
|---|---|---|---|
| R3 = 31.136 | D3 = 3.60 | N2 = 1.8850 | ν2 = 41.0 |
| R4 = 53.389 | D4 = 1.76 | | |
| R5 = 171.615 | D5 = 4.30 | N3 = 1.6636 | ν3 = 30.8 |
| R6 = 18.045 | D6 = 1.00 | NGNL1 = 1.5912 | νGNL1 = 31.7 |
| R7 = 20.535 | D7 = 7.32 | | |
| R8 = ∞ (STOP) | D8 = 8.09 | | |
| R9 = −18.791 | D9 = 2.56 | N4 = 1.8610 | ν4 = 26.8 |
| R10 = −355.861 | D10 = 4.97 | N5 = 1.7368 | ν5 = 52.0 |
| R11 = −28.736 | D11 = 0.15 | | |
| R12 = −146.911 | D12 = 4.43 | N6 = 1.8815 | ν6 = 41.2 |
| R13 = −32.915 | D13 = 0.15 | | |
| R14 = 100.019 | D14 = 3.19 | N7 = 1.7800 | ν7 = 50.0 |
| R15 = −296.6298 | | | |

NUMERICAL EXAMPLE 3

| f = 51.8 Fno = 1.41 2ω = 45.2° | | | |
|---|---|---|---|
| R1 = 65.153 | D1 = 4.59 | N1 = 1.7808 | ν1 = 49.9 |
| R2 = −664.747 | D2 = 1.50 | | |
| R3 = 32.303 | D3 = 3.98 | N2 = 1.8850 | ν2 = 41.0 |
| R4 = 55.984 | D4 = 2.11 | | |
| R5 = 303.165 | D5 = 5.00 | N3 = 1.6540 | ν3 = 31.5 |
| R6 = 21.855 | D6 = 7.08 | | |
| R7 = ∞ (STOP) | D7 = 0.30 | | |
| R8 = ∞ | D8 = 1.80 | N4 = 1.5168 | ν4 = 64.2 |
| R9 = ∞ | D9 = 0.23 | NGNL1 = 1.5912 | νGNL1 = 31.7 |
| R10 = −471.686 | D10 = 6.09 | | |
| R11 = −20.113 | D11 = 1.97 | N5 = 1.8594 | ν5 = 26.2 |
| R12 = −506.924 | D12 = 5.83 | N6 = 1.7800 | ν6 = 50.0 |
| R13 = −31.008 | D13 = 0.15 | | |
| R14 = −147.555 | D14 = 4.14 | N7 = 1.8850 | ν7 = 41.0 |
| R15 = −34.876 | D15 = 0.15 | | |
| R16 = 99.367 | D16 = 2.93 | N8 = 1.7800 | ν8 = 50.0 |
| R17 = −397.5776 | | | |

NUMERICAL EXAMPLE 4

| f = 51.8 Fno = 1.41 2ω = 45.2° | | | |
|---|---|---|---|
| R1 = 51.799 | D1 = 4.98 | N1 = 1.7800 | ν1 = 50.0 |
| R2 = 1318.972 | D2 = 0.15 | | |
| R3 = 30.962 | D3 = 3.67 | N2 = 1.8850 | ν2 = 41.0 |
| R4 = 51.048 | D4 = 1.69 | | |
| R5 = 121.190 | D5 = 5.00 | N3 = 1.6460 | ν3 = 32.2 |
| R6 = 19.013 | D6 = 8.55 | | |
| R7 = ∞ (STOP) | D7 = 8.77 | | |
| R8 = −18.270 | D8 = 2.31 | N4 = 1.8573 | ν4 = 25.8 |
| R9 = −1074.998 | D9 = 1.00 | NGNL1 = 1.5912 | νGNL1 = 31.7 |
| R10 = −92.496 | D10 = 4.65 | N5 = 1.7800 | ν5 = 50.0 |
| R11 = −28.842 | D11 = 0.15 | | |
| R12 = −152.856 | D12 = 4.75 | N6 = 1.8285 | ν6 = 45.1 |
| R13 = −31.109 | D13 = 0.15 | | |
| R14 = 92.675 | D14 = 3.40 | N7 = 1.7800 | ν7 = 50.0 |
| R15 = −412.0039 | | | |

NUMERICAL EXAMPLE 5

| f = 51.8 Fno = 1.41 2ω = 45.2° | | | |
|---|---|---|---|
| R1 = 56.135 | D1 = 4.69 | N1 = 1.8029 | ν1 = 47.5 |
| R2 = 1342.023 | D2 = 1.65 | | |
| R3 = 32.159 | D3 = 4.30 | N2 = 1.8850 | ν2 = 41.0 |
| R4 = 50.578 | D4 = 1.77 | | |
| R5 = 161.327 | D5 = 5.00 | N3 = 1.6758 | ν3 = 30.0 |
| R6 = 20.743 | D6 = 7.27 | | |
| R7 = ∞ (STOP) | D7 = 7.63 | | |
| R8 = −17.732 | D8 = 1.80 | N4 = 1.7430 | ν4 = 26.4 |
| R9 = 747.121 | D9 = 3.28 | N5 = 1.8850 | ν5 = 41.0 |
| R10 = −51.478 | D10 = 1.00 | NGNL1 = 1.5912 | νGNL1 = 31.7 |
| *R11 = −33.947 (ASP) | D11 = 0.15 | | |
| R12 = −178.288 | D12 = 4.83 | N6 = 1.8081 | ν6 = 47.0 |
| R13 = −28.703 | D13 = 0.15 | | |
| R14 = 262.977 | D14 = 3.26 | N7 = 1.6200 | ν7 = 60.3 |
| R15 = −81.135 | | | |

| ASPHERIC FACTOR | | | |
|---|---|---|---|
| k | B | C | D |
| 11TH FACE −4.151E−01 | 3.247E−06 | 6.306E−10 | 1.553E−11 |

NUMERICAL EXAMPLE 6

| f = 51.8 Fno = 1.86 2ω = 45.2° | | | |
|---|---|---|---|
| R1 = 46.735 | D1 = 3.95 | N1 = 1.7867 | ν1 = 49.2 |
| R2 = 497.417 | D2 = 2.00 | | |
| R3 = 24.542 | D3 = 3.20 | N2 = 1.7800 | ν2 = 50.0 |
| R4 = 40.792 | D4 = 1.80 | | |
| R5 = 107.730 | D5 = 1.00 | NGNL1 = 1.5912 | νGNL1 = 31.7 |
| R6 = −287.522 | D6 = 2.03 | N3 = 1.6625 | ν3 = 30.9 |
| R7 = 18.107 | D7 = 6.45 | | |
| R8 = ∞ (STOP) | D8 = 6.12 | | |
| R9 = −18.549 | D9 = 2.61 | N4 = 1.6760 | ν4 = 30.0 |
| R10 = −289.597 | D10 = 5.00 | N5 = 1.7960 | ν5 = 48.2 |
| R11 = −23.422 | D11 = 0.15 | | |
| R12 = 98.275 | D12 = 2.94 | N6 = 1.7800 | ν6 = 50.0 |
| R13 = −83.594 | | | |

NUMERICAL EXAMPLE 7

| MAGNIFICATIONSX−0.22 Fno = 4.12 2ω = 31.4° | | | |
|---|---|---|---|
| R1 = 51.609 | D1 = 7.31 | N1 = 1.8850 | ν1 = 41.0 |
| R2 = 183.194 | D2 = 4.54 | | |
| R3 = 32.292 | D3 = 7.79 | N2 = 1.4905 | ν2 = 70.0 |
| R4 = 398.392 | D4 = 2.51 | N3 = 1.7228 | ν3 = 31.9 |
| R5 = 21.744 | D5 = 1.00 | NGNL1 = 1.5912 | νGNL1 = 31.7 |
| R6 = 24.561 | D6 = 14.39 | | |
| R7 = ∞ (STOP) | D7 = 14.58 | | |
| R8 = −24.078 | D8 = 1.80 | N4 = 1.6673 | ν4 = 30.6 |
| R9 = −159.886 | D9 = 9.69 | N5 = 1.7965 | ν5 = 48.2 |
| R10 = −34.857 | D10 = 0.15 | | |
| R11 = −343.120 | D11 = 4.25 | N6 = 1.8850 | ν6 = 41.0 |
| R12 = −66.076 | | | |

NUMERICAL EXAMPLE 8

| f = 100 Fno = 3.0 magnification = −0.11X 2ω = 36.0° | | | |
|---|---|---|---|
| R1 = 55.721 | D1 = 7.59 | N1 = 1.8850 | ν1 = 41.0 |
| R2 = 162.194 | D2 = 0.15 | | |
| R3 = 37.531 | D3 = 6.80 | N2 = 1.8110 | ν2 = 46.7 |
| R4 = 74.835 | D4 = 3.00 | NGNL1 = 1.6356 | νGNL1 = 22.7 |
| R5 = 212.059 | D5 = 8.01 | N3 = 1.8500 | ν3 = 23.0 |
| R6 = 23.371 | D6 = 10.71 | | |
| R7 = ∞ (stop) | D7 = 15.69 | | |
| R8 = −29.589 | D8 = 7.53 | N4 = 1.8500 | ν4 = 23.0 |
| R9 = −40.187 | D9 = 0.15 | | |
| R10 = 357.666 | D10 = 7.71 | N5 = 1.6947 | ν5 = 54.4 |
| R11 = −60.971 | | | |

NUMERICAL EXAMPLE 9

| f = 55 Fno = 4.1 2ω = 65.0° | | | |
|---|---|---|---|
| R1 = 13.933 | D1 = 3.73 | N1 = 1.8804 | ν1 = 41.3 |
| R2 = 20.353 | D2 = 1.80 | N2 = 1.8500 | ν2 = 23.0 |
| R3 = 10.495 | D3 = 0.70 | NGNL1 = 1.6356 | νGNL1 = 22.7 |
| *R4 = 12.329(asphere) | D4 = 1.30 | | |
| R5 = 23.673 | D5 = 2.33 | N3 = 1.4870 | ν3 = 70.4 |
| R6 = 152.792 | D6 = 2.70 | | |
| R7 = ∞ (stop) | D7 = 1.50 | | |
| R8 = −38.826 | D8 = 2.80 | N4 = 1.6694 | ν4 = 56.1 |
| R9 = 20.707 | D9 = 3.90 | N5 = 1.6063 | ν5 = 54.9 |
| R10 = −22.157 | D10 = 1.77 | | |
| R11 = −11.128 | D11 = 1.80 | N6 = 1.6158 | ν6 = 35.0 |
| R12 = −91.967 | D12 = 5.42 | N7 = 1.8508 | ν7 = 43.3 |
| R13 = −18.039 | | | |

| | aspheric factor | | |
|---|---|---|---|
| | k | B | C | D |
| 4th face | 5.385E−02 | 5.836E−06 | 4.386E−08 | −1.256E−10 |

NUMERICAL EXAMPLE 10

| f = 50 Fno = 2.5 2ω = 46.8° | | | |
|---|---|---|---|
| R1 = 25.911 | D1 = 3.47 | N1 = 1.8727 | ν1 = 32.3 |
| R2 = 61.500 | D2 = 0.30 | | |
| R3 = 16.091 | D3 = 4.32 | N2 = 1.4870 | ν2 = 70.4 |
| R4 = 111.986 | D4 = 1.81 | N3 = 1.6511 | ν3 = 31.8 |
| R5 = 10.821 | D5 = 4.38 | | |
| R6 = ∞ (stop) | D6 = 3.92 | | |
| R7 = −86.245 | D7 = 4.50 | N4 = 1.8850 | ν4 = 41.0 |
| R8 = −24.500 | D8 = 1.00 | | |
| R9 = −13.585 | D9 = 1.80 | N5 = 1.8478 | ν5 = 23.9 |
| R10 = −46.465 | D10 = 0.80 | NGNL1 = 1.6356 | νGNL1 = 22.7 |
| R11 = −29.218 | D11 = 4.77 | N6 = 1.8850 | ν6 = 41.0 |
| R12 = −16.104 | | | |

NUMERICAL EXAMPLE 11

| f = 50 Fno = 2.5 2ω = 46.8° | | | |
|---|---|---|---|
| R1 = 26.650 | D1 = 3.11 | N1 = 1.8850 | ν1 = 41.0 |
| R2 = 49.625 | D2 = 1.42 | | |
| R3 = 16.286 | D3 = 3.91 | N2 = 1.5982 | ν2 = 61.5 |
| R4 = 66.101 | D4 = 1.80 | N3 = 1.6091 | ν3 = 35.8 |
| R5 = 10.547 | D5 = 4.22 | | |
| R6 = ∞ (stop) | D6 = 3.88 | | |
| R7 = −64.934 | D7 = 4.00 | N4 = 1.8850 | ν4 = 41.0 |
| R8 = −23.648 | D8 = 0.76 | | |
| R9 = −14.556 | D9 = 0.88 | NGNL1 = 1.5532 | νGNL1 = 39.8 |
| R10 = −10.690 | D10 = 2.09 | N5 = 1.8672 | ν5 = 29.5 |
| R11 = −59.251 | D11 = 5.00 | N6 = 1.8850 | ν6 = 41.0 |
| R12 = −16.017 | | | |

NUMERICAL EXAMPLE 12

| f = 100 Fno = 4.0 2ω = 59.2° | | | |
|---|---|---|---|
| R1 = 35.563 | D1 = 4.18 | N1 = 1.8850 | ν1 = 41.0 |
| R2 = 67.516 | D2 = 0.15 | | |
| R3 = 30.259 | D3 = 3.28 | N2 = 1.8850 | ν2 = 41.0 |
| R4 = 33.221 | D4 = 1.50 | | |
| R5 = 61.286 | D5 = 1.80 | N3 = 1.8500 | ν3 = 23.0 |
| R6 = 20.538 | D6 = 0.80 | NGNL1 = 1.6959 | νGNL1 = 17.7 |
| R7 = 25.113 | D7 = 3.76 | | |
| R8 = 59.621 | D8 = 1.95 | N4 = 1.8745 | ν4 = 33.4 |
| R9 = 114.083 | D9 = 6.43 | | |
| R10 = ∞ (stop) | D10 = 4.30 | | |
| R11 = −91.143 | D11 = 3.00 | N5 = 1.8850 | ν5 = 41.0 |
| R12 = −55.759 | D12 = 1.38 | | |
| R13 = −32.366 | D13 = 6.21 | N6 = 1.7578 | ν6 = 28.9 |
| R14 = −137.166 | D14 = 4.79 | N7 = 1.8850 | ν7 = 41.0 |
| R15 = −39.141 | | | |

TABLE 1

| | Examples 1, 8 to 10 UV-CURING RESIN 1 | Examples 2 to 7, 11 TiO$_2$ 7% - UV-CURING RESIN 2 | Example 12 N-polyvinyl carbazole |
|---|---|---|---|
| d-RAY REFRACTION INDEX | 1.63555 | 1.59121 | 1.69591 |
| g-RAY REFRACTION INDEX | 1.67532 | 1.61854 | 1.75164 |
| C-RAY REFRACTION INDEX | 1.62807 | 1.58618 | 1.68528 |
| F-RAY REFRACTION INDEX | 1.65604 | 1.60484 | 1.72465 |
| νd | 22.7 | 31.7 | 17.7 |
| θgd | 1.422 | 1.464 | 1.415 |
| θgF | 0.689 | 0.734 | 0.686 |

TABLE 2

| | UV-CURING RESIN 2 | TiO$_2$ |
|---|---|---|
| d-RAY REFRACTION INDEX | 1.52415 | 2.30377 |
| g-RAY REFRACTION INDEX | 1.53706 | 2.45676 |
| C-RAY REFRACTION INDEX | 1.52116 | 2.28032 |
| F-RAY REFRACTION INDEX | 1.53133 | 2.37452 |
| νd | 51.6 | 13.8 |
| θgd | 1.269 | 1.624 |
| θgF | 0.563 | 0.873 |

TABLE 3

| Conditional equation | | Numerical example | | | | | | |
|---|---|---|---|---|---|---|---|---|
| | | 1 | 2 | 3 | 4 | 5 | 6 | 7 |
| (16) | X/L | 0.295 | 0.154 | 0.044 | 0.225 | 0.292 | 0.228 | 0.212 |
| (17) | X1/L | — | 0.111 | — | — | — | 0 | 0.037 |
| (18) | X2/L | 0.121 | — | 0.168 | 0 | 0.07 | — | — |
| (19) | φGNL | 0.00469 | 0.00457 | 0.00125 | 0.00584 | 0.00606 | 0.00753 | 0.00356 |
| (6) | fF/f | 3.46 | 3.36 | 3.63 | 3.17 | 4.22 | 3.32 | 1.84 |
| (7) | fR/f | 0.79 | 0.80 | 0.81 | 0.79 | 0.78 | 0.86 | 0.89 |
| (8) | fF/fR | 4.40 | 4.21 | 4.52 | 4.01 | 5.39 | 3.84 | 2.07 |
| (9) | Ra/f | 0.37 | 0.40 | 0.42 | 0.37 | 0.40 | 0.35 | 0.25 |
| (10) | Rb/f | −0.34 | −0.36 | −0.39 | −0.31 | −0.34 | −0.36 | −0.25 |

| Conditional equation | | Numerical Example | | | | |
|---|---|---|---|---|---|---|
| | | 8 | 9 | 10 | 11 | 12 |
| (11) | fFS/f | −0.315 | −1.871 | −0.371 | −0.417 | −0.747 |
| (12) | fRS/f | −1.959 | −0.431 | −1.199 | −0.719 | −0.888 |
| (16) | X/L | 0.278 | 0.213 | 0.361 | 0.278 | 0.279 |
| (17) | X1/L | 0 | 0.061 | — | — | 0.041 |
| (18) | X2/L | — | — | 0 | 0.067 | — |
| (19) | φGNL | 0.0055 | 0.0103 | 0.0082 | 0.0149 | 0.0066 |
| (6) | fF/f | 1.493 | 1.005 | 3.668 | 2.686 | 1.737 |
| (7) | fR/f | 1.005 | 2.440 | 0.857 | 0.926 | 1.423 |
| (8) | fF/fR | 1.486 | 0.412 | 4.281 | 2.901 | 1.220 |
| (9) | Ra/f | 0.234 | 0.191 | 0.216 | 0.211 | 0.205 |
| (10) | Rb/f | −0.296 | −0.202 | −0.272 | −0.214 | −0.324 |
| (14) | νa | 23.0 | 22.7 | 31.8 | 35.8 | 23.0 |
| (15) | νb | 23.0 | 35.0 | 23.9 | 29.5 | 28.9 |

Next, an exemplary embodiment of a digital still camera (image-pickup apparatus) using the optical system according to at least one exemplary embodiment as an image-pickup optical system will be described with reference to FIG. 25.

Figure 25:
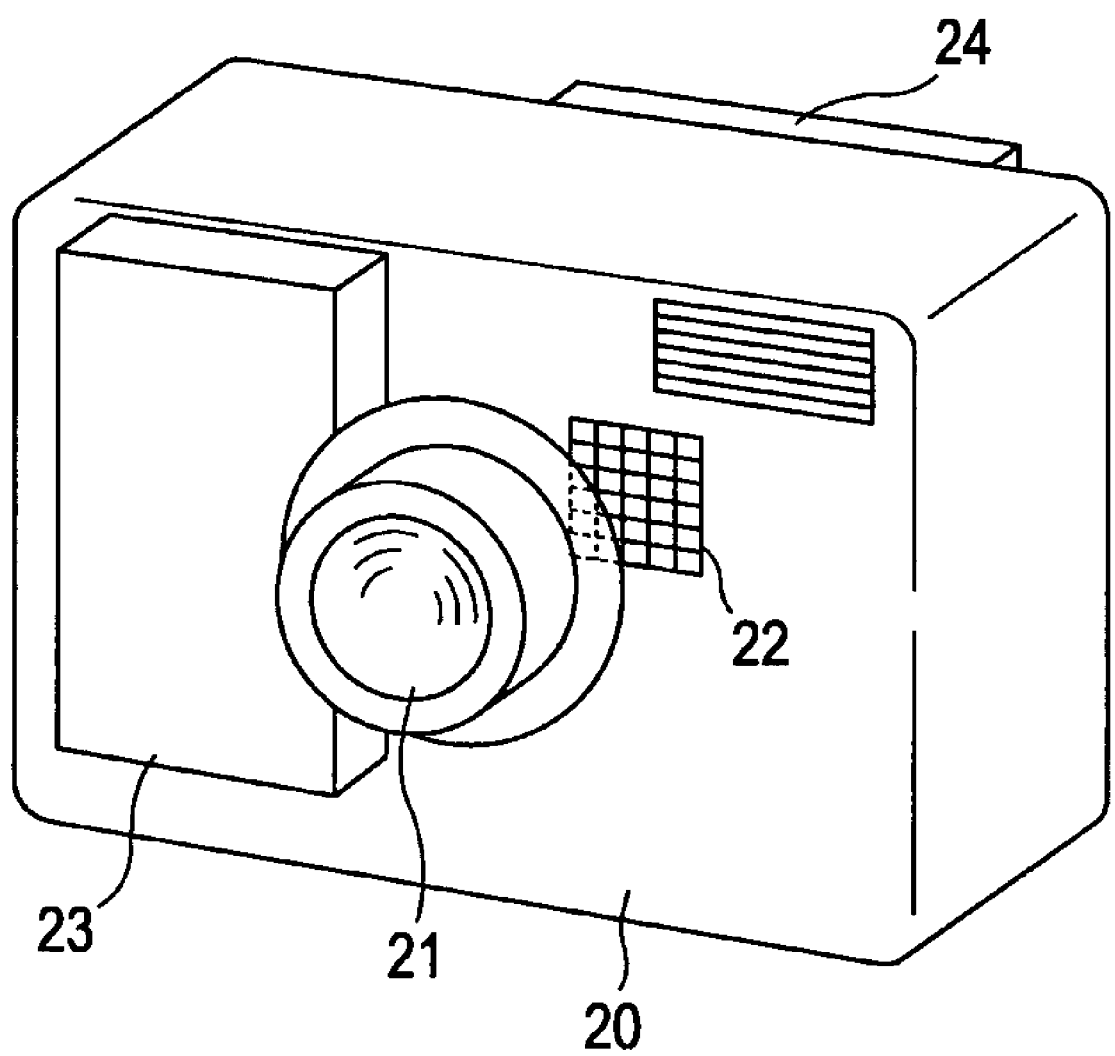
FIG. 25 is a schematic view of part of an image-pickup apparatus according to at least one exemplary embodiment.

Referring to FIG. 25, reference numeral 20 denotes a camera body; numeral 21 an image-pickup optical system configured of the optical system according to at least one exemplary embodiment; numeral 22 a solid-state image-pickup device (photoelectric transducer), such as a CCD sensor and a CMOS sensor, built in the camera body 20 and configured of the image-pickup optical system 21 for receiving an object image formed by the image-pickup optical system 21; numeral 23 a memory for recording the information corresponding to the object image photo-electrically converted by the image-pickup device 22; and numeral 24 a finer which includes a liquid crystal display panel and arranged above the image-pickup device 22 for observing the object image formed on the image-pickup device 22.

By applying the optical system according to at least one exemplary embodiment to an image-pickup device, such as a digital still camera, in such a manner, an image-pickup apparatus with high optical performances can be achieved.

Figure 26:
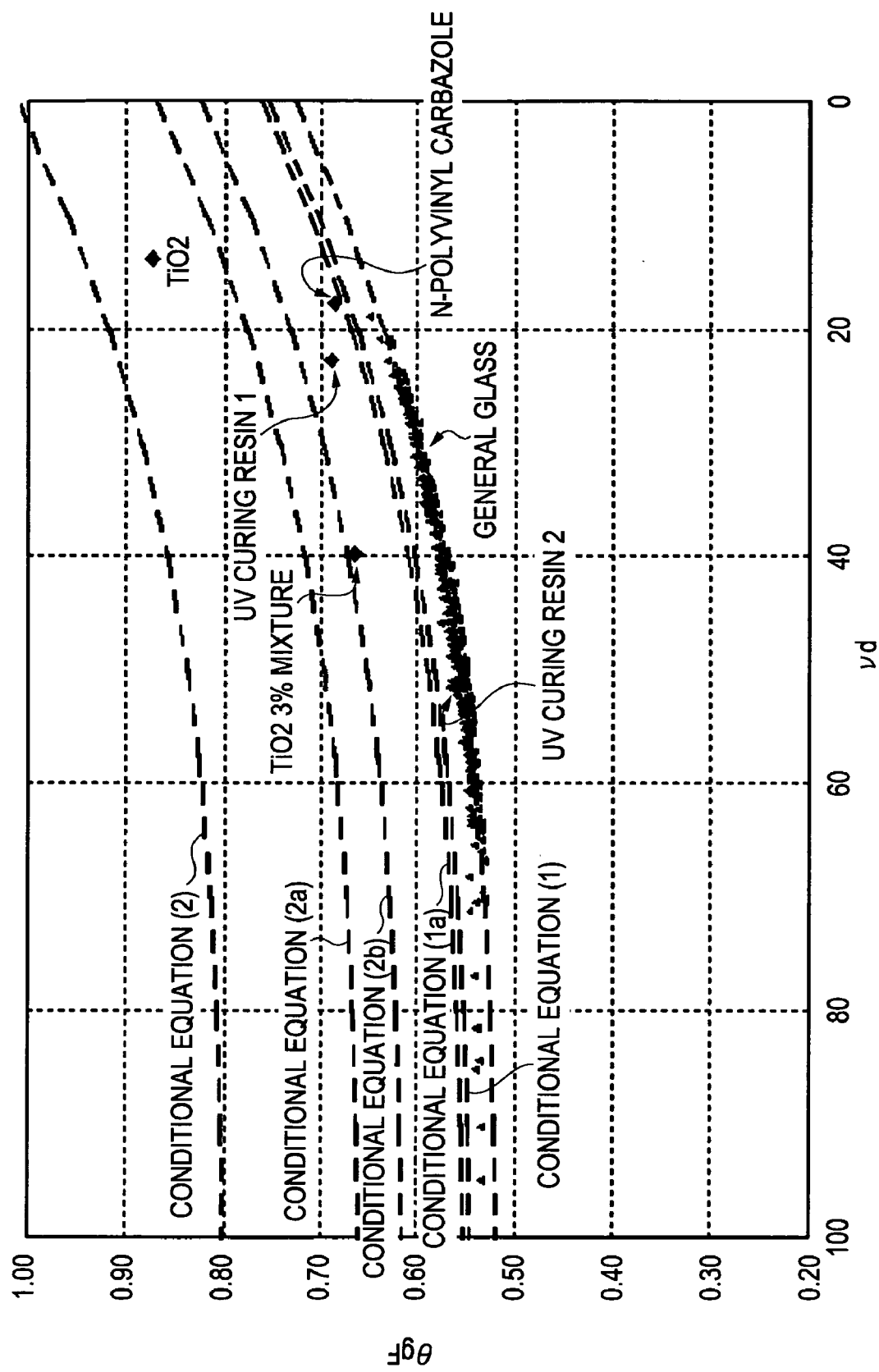
FIG. 26 is a drawing illustrating extents of conditional equations (1) and/or (2) according to at least one exemplary embodiment.
Figure 27:
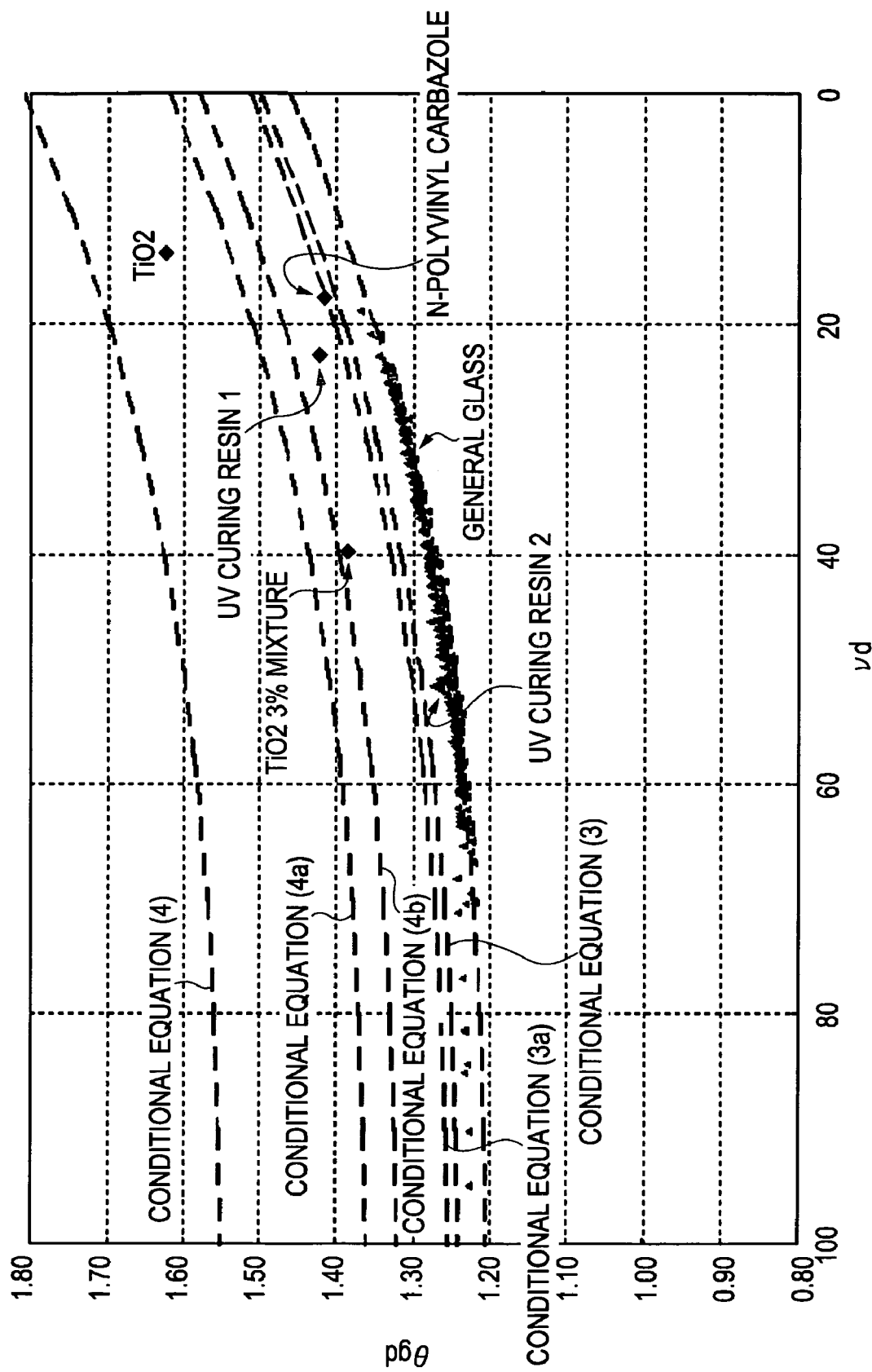
FIG. 27 is a drawing illustrating extents of conditional equations (3) and (4) according to at least one exemplary embodiment.

FIG. 26 illustrates the relationship between the ranges of the conditional equations (1) and/or (2) according to the exemplary embodiment and the substances shown in Tables 1 and 2 and general optical glasses with respect to the Abbe number and the partial dispersion ratio θgF. FIG. 27 illustrates the relationship between the ranges of the conditional equations (3) and (4) according to at least one exemplary embodiment and the substances shown in Tables 1 and 2 and general optical glasses with respect to the Abbe number and the partial dispersion ratio θgd.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-175495 filed Jun. 15, 2005, which is hereby incorporated by reference herein in its entirety.

What is claimed is:

1. An optical system including a plurality of refractive optical elements arranged substantially symmetrically with respect to an aperture-stop, comprising:

a refractive solid optical element, wherein an Abbe number νd of the solid and a partial dispersion ratio θgF of the solid satisfy the following conditions:

$$\theta gF - (-1.665 \times 10^{-7} \cdot \nu d^3 + 5.213 \times 10^{-5} \cdot \nu d^2 - 5.656 \times 10^{-3} \cdot \nu d) > 0.755; \text{ and}$$

$$\theta gF - (-1.665 \times 10^{-7} \cdot \nu d^3 + 5.213 \times 10^{-5} \cdot \nu d^2 - 5.656 \times 10^{-3} \cdot \nu d) < 1.011.$$

2. The optical system according to claim 1, wherein a partial dispersion ratio θgd of the solid satisfies the following conditions:

$$\theta gd - (-1.687 \times 10^{-7} \cdot \nu d^3 + 5.702 \times 10^{-5} \cdot \nu d^2 - 6.603 \times 10^{-3} \cdot \nu d) > 1.500; \text{ and}$$

$$\theta gd - (-1.687 \times 10^{-7} \cdot \nu d^3 + 5.702 \times 10^{-5} \cdot \nu d^2 - 6.603 \times 10^{-3} \cdot \nu d) < 1.809.$$

3. The optical system according to claim 1, wherein the optical system satisfies the following condition:

$$X/L < 0.4,$$

where L is the distance from the refractive surface of the optical system closest to the object to the refractive surface closest to the image, and X is the distance from the refractive surface of a refractive optical element adjacent to an intersection of the optical axis and a paraxial chief ray to the intersection.

4. The optical system according to claim 1, wherein the Abbe number vd of the solid satisfies the following condition:

$$vd<60.$$

5. The optical system according to claim 1, further comprising:
   a first positive lens arranged on the object side of the aperture-stop;
   a first negative lens with a concave surface on the image side, which is arranged between the aperture-stop and the first positive lens;
   a second negative lens with a concave surface on the object side, which is arranged on the object side of the aperture-stop; and
   a second positive lens arranged so that the second negative lens is between the aperture-stop and the second positive lens.

6. The optical system according to claim 5, wherein an Abbe number va of the first negative lens and an Abbe number vb of the second negative lens satisfy the following conditions:

$$va<40; \text{ and}$$

$$vb<40.$$

7. An optical system comprising:
   a front unit having positive optical power, which is arranged on the object side of an aperture-stop, the front unit including:
      a first positive lens; and
      a first negative lens with a concave surface on the aperture-stop side, wherein the first negative lens is between the first positive lens and the aperture-stop; and
   a rear unit having positive refractive power, which is arranged on the image side of the aperture-stop, the rear unit including:
      a second negative lens with a concave surface on the aperture-stop side; and
      a second positive lens, wherein the second negative lens is between the second positive lens and the aperture-stop,
   wherein the following conditions are satisfied:

$$0.8<fF/f<5.0;$$

$$0.4<fR/f<3.0; \text{ and}$$

$$0.2<fF/fR<10,$$

where fF and fR are focal lengths of the front unit and the rear unit, respectively, and f is a focal length of the entire system, and
   wherein at least one of the front and rear units comprises a solid refractive optical element, and
   wherein an Abbe number vd of the solid and a partial dispersion ratio θgF of the solid satisfy the following conditions:

$$\theta gF-(-1.665\times10^{-7}\cdot vd^3+5.213\times10^{-5}\cdot vd^2-5.656\times 10^{-3}\cdot vd)>0.755; \text{ and}$$

$$\theta gF-(-1.665\times10^{-7}\cdot vd^3+5.213\times10^{-5}\cdot vd^2-5.656\times 10^{-3}\cdot vd)<1.011.$$

8. The optical system according to claim 7, wherein a partial dispersion ratio θgd of the solid satisfies the following conditions:

$$\theta gd-(-1.687\times10^{-7}\cdot vd^3+5.702\times10^{-5}\cdot vd^2-6.603\times 10^{-3}\cdot vd)>1.500; \text{ and}$$

$$\theta gd-(-1.687\times10^{-7}\cdot vd^3+5.702\times10^{-5}\cdot vd^2-6.603\times 10^{-3}\cdot vd)<1.809.$$

9. The optical system according to claim 7, wherein the optical system satisfies the following condition:

$$X/L<0.4,$$

where L is the distance from the refractive surface of the optical system closest to the object to the refractive surface closest to the image, and X is the distance from the refractive surface of a refractive optical element adjacent to an intersection of the optical axis and a paraxial chief ray to the intersection.

10. The system according to claim 7, wherein the Abbe number vd of the solid satisfies the following condition:

$$vd<60.$$

11. The system according to claim 7, wherein the following conditions are satisfied:

$$0.1<Ra/f<0.5; \text{ and}$$

$$-0.5<Rb/f<-0.1,$$

where Ra is a radius of curvature of the surface on the aperture-stop side of the first negative lens, and Rb is a radius of curvature of the surface on the aperture-stop side of the second negative lens.

12. The system according to claim 7, wherein an Abbe number va of the first negative lens and an Abbe number vb of the second negative lens satisfy the following conditions:

$$va<40; \text{ and}$$

$$vb<40.$$

13. An optical system comprising:
   a front unit having positive optical power, which is arranged on the object side of an aperture-stop, the front unit including:
      a first positive lens; and
      a front sub unit having a first negative lens with a concave surface on the aperture-stop side, wherein the front sub unit is between the first positive lens and the aperture-stop; and
   a rear unit having positive refractive power, which is arranged on the image side of the aperture-stop, the rear unit including:
      a rear sub unit having a second negative lens with a concave surface on the aperture-stop side; and
      a second positive lens, wherein the rear sub unit is between the second positive lens and the aperture stop,
   wherein at least one of the following conditions is satisfied:

$$fFS/f<-0.7; \text{ and}$$

$$fRS/f<-0.7,$$

where fFS and fRS are focal lengths of the front sub unit and the rear sub unit, respectively, and f is a focal length of the entire system,
   wherein at least one of the front and rear units comprises a solid refractive optical element, and
   wherein an Abbe number vd of the solid and a partial dispersion ratio θgF of the solid satisfy the following conditions:

$\theta gF-(-1.665\times10^{-7}\cdot vd^3+5.213\times10^{-5}\cdot vd^2-5.656\times10^{-3}\cdot vd)>0.755$; and $\theta gF-(-1.665\times10^{-7}\cdot vd^3+5.213\times10^{-5}\cdot vd^2-5.656\times10^{-3}\cdot vd)<1.011$.

14. The optical system according to claim 13, wherein the following conditions are satisfied:

$0.8<fF/f<5.0$;

$0.4<fR/f<3.0$; and $0.2<fF/fR<10$, where fF and fR are focal lengths of the front unit and the rear unit, respectively, and f is a focal length of the entire system.

15. The optical system according to claim 13, wherein a partial dispersion ratio θgd of the solid satisfies the following conditions:

$\theta gd-(-1.687\times10^{-7}\cdot vd^3+5.702\times10^{-5}\cdot vd^2-6.603\times10^{-3}\cdot vd)>1.500$; and $\theta gd-(-1.687\times10^{-7}\cdot vd^3+5.702\times10^{-5}\cdot vd^2-6.603\times10^{-3}\cdot vd)<1.809$.

16. The optical system according to claim 13, wherein the optical system satisfies the following condition:

$X/L<0.4$, where L is the distance from the refractive surface of the optical system closest to the object to the refractive surface closest to the image, and X is the distance from the refractive surface of the refractive optical element adjacent to an intersection of the optical axis and a paraxial chief ray to the intersection.

17. The optical system according to claim 13, wherein the Abbe number νd of the solid satisfies the following condition:

$vd<60$.

18. The optical system according to claim 13, wherein the following conditions are satisfied:

$0.1<Ra/f<0.5$; and $-0.5<Rb/f<-0.1$, where Ra is a radius of curvature of the surface on the aperture-stop side of the first negative lens, and Rb is a radius of curvature of the surface on the aperture-stop side of the second negative lens.

19. The system according to claim 13, wherein an Abbe number νa of the first negative lens and an Abbe number νb of the second negative lens satisfy the following conditions:

$va<40$; and $vb<40$.

20. An optical apparatus comprising:
the optical system according to claim 1; and
a photoelectric transducer configured to receive the image formed by the optical system.

21. An optical apparatus comprising:
the optical system according to claim 7; and
a photoelectric transducer configured to receive the image formed by the optical system.

22. An optical apparatus comprising:
the optical system according to claim 13; and
a photoelectric transducer configured to receive the image formed by the optical system.

* * * * *